US012607707B2

(12) United States Patent
Duan et al.

(10) Patent No.: US 12,607,707 B2

(45) Date of Patent: Apr. 21, 2026

(54) NEAR/FAR-FIELD DETERMINATION OF RECONFIGURABLE INTELLIGENT SURFACE (RIS) FOR MOBILE DEVICE POSITIONING

(71) Applicant: QUALCOMM Incorporated, San Diego, CA (US)

(72) Inventors: Weimin Duan, San Diego, CA (US); Jing Lei, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 553 days.

(21) Appl. No.: 18/259,774

(22) PCT Filed: Jan. 28, 2022

(86) PCT No.: PCT/US2022/070422

§ 371 (c)(1),
(2) Date: Jun. 28, 2023

(87) PCT Pub. No.: WO2022/183158

PCT Pub. Date: Sep. 1, 2022

(65) Prior Publication Data

US 2024/0069146 A1      Feb. 29, 2024

(30) Foreign Application Priority Data

Feb. 25, 2021      (GR) .............................. 20210100114

(51) Int. Cl.
*H04W 4/029* (2018.01)
*G01S 5/02* (2010.01)

(52) U.S. Cl.
CPC .......... *G01S 5/0273* (2013.01); *G01S 5/0236* (2013.01); *H04W 4/029* (2018.02)

(58) Field of Classification Search
CPC .... G01S 13/765; G01S 5/0236; G01S 5/0273; H04W 4/029

(Continued)

(56) References Cited

U.S. PATENT DOCUMENTS 10,433,275 B2      10/2019  Edge et al.
12,196,845 B2 *      1/2025  Bayesteh ................ G01S 13/42

(Continued)

FOREIGN PATENT DOCUMENTS

CN      107430203 A      12/2017
IT      20100089 A1      5/2012

(Continued)

OTHER PUBLICATIONS

Shuhao Zeng IEEE communication Letter, vol. 25, No. Jan. 1, 2021 .Reconfigurable Intelligent Surface (RIS) Assisted Wireless Coverage Extension: RIS Orientation and Location Optimization.*

(Continued)

*Primary Examiner* — Joseph Arevalo

(74) *Attorney, Agent, or Firm* — Weaver Austin Villeneuve & Sampson LLP/QUALCOMM Incorporated

(57)      ABSTRACT

Techniques for determining reconfigurable intelligent surface (RIS) operation for RIS-assisted position determination of a mobile device in a wireless communications system, according to this disclosure, may comprise determining, for one or more RISs, whether the mobile device is within a near-field operational distance of the RIS based at least in part on a determined near-field operational distance of the RIS, and a relative distance between the mobile device and the RIS. Techniques may also comprise determining an RIS-assisted position of the mobile device based on measurements made by the mobile device of radio frequency (RF) signals reflected from at least one RIS of the one or (Continued)

more RISs. Techniques may also comprise providing the determined RIS-assisted position of the mobile device.

30 Claims, 9 Drawing Sheets

(58) Field of Classification Search
USPC ... 455/456.1, 506, 11.11, 550.1, 41.1, 562.1, 455/226.1, 411
See application file for complete search history.

(56) References Cited

U.S. PATENT DOCUMENTS

| | | | | |
|---|---|---|---|---|
| 2019/0230475 A1* | 7/2019 | Edge | .................... | H04W 4/029 |
| 2020/0029165 A1* | 1/2020 | Kumar | ...................... | G01S 5/10 |
| 2022/0021125 A1* | 1/2022 | Baligh | ................... | H01Q 21/06 |

FOREIGN PATENT DOCUMENTS

| | | |
|---|---|---|
| JP | 2023519613 A | 5/2023 |
| WO | 2018217323 | 11/2018 |

OTHER PUBLICATIONS

International Search Report and Written Opinion—PCT/US2022/070422—ISA/EPO—Jun. 20, 2022.
Marco, D.R., et al., "Smart Radio Environments Empowered by Reconfigurable Intelligent Surfaces: How it Works, State of Research, and Road Ahead", Arxiv.Org, Cornell University Library, 201 Olin Library Cornell University Ithaca, NY14853, Apr. 20, 2020, XP081648502, pp. 1-74.
Wymeersch H., et al., "Radio Localization and Mapping with Reconfigurable Intelligent Surfaces", arxiv.org, 201 Olin Library Cornell University, Ithaca, NY, 14853, Dec. 19, 2019, XP081569725, pp. 1-7, Figure 1, Abstract, Right-Hand Column, Lines 29-31, Figure 3, pp. 5,6, p. 2, left-hand column, line 2-8 p. 3, left-hand column, line 2-4 p. 4, right-hand columns, lines 6, 7, 11, 12, 36, 37 p. 5, left-hand column, line 15-17, pp. 5,6.

\* cited by examiner

110

105

133

120

135

130

160

170

180

100

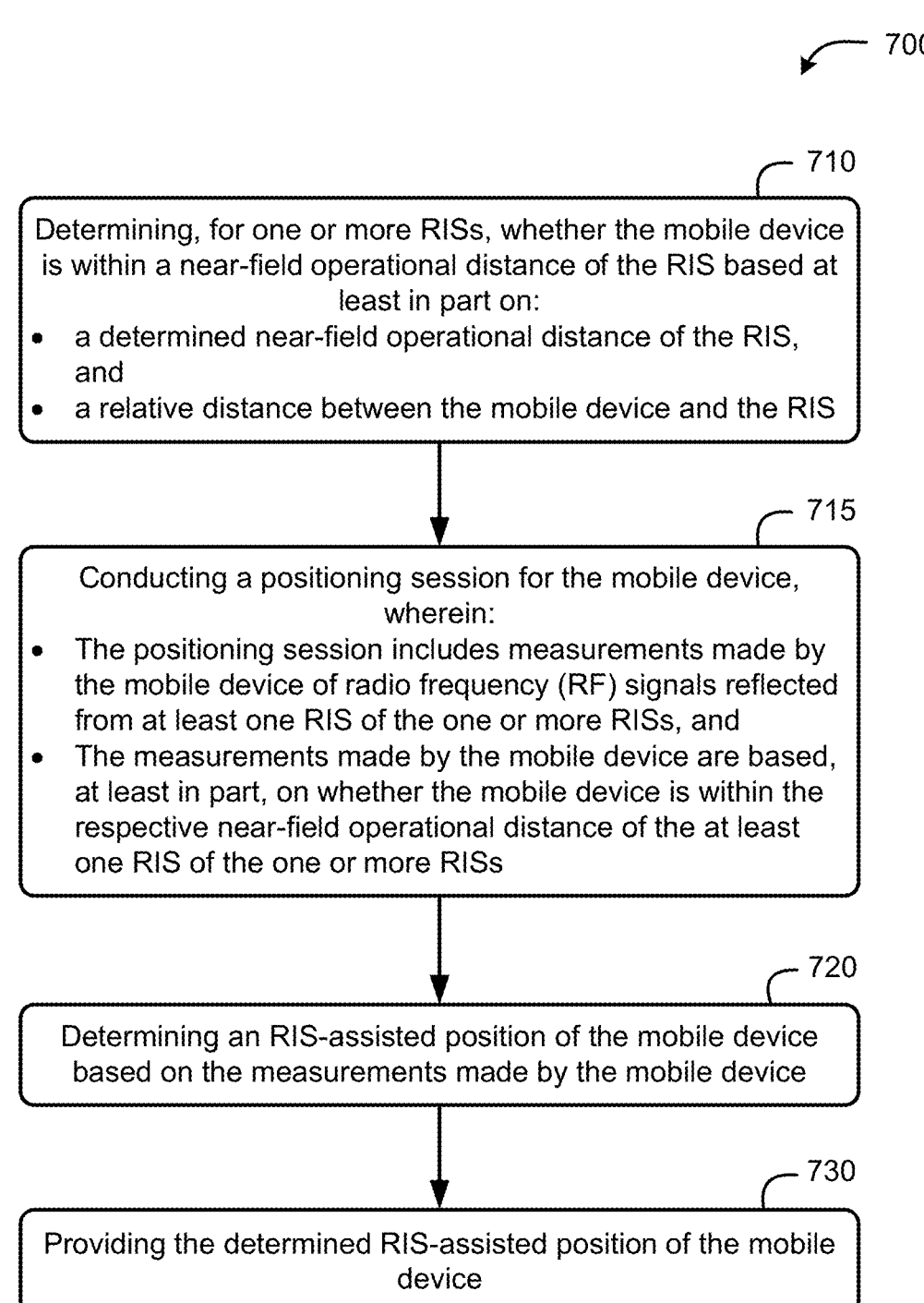

700

710

Determining, for one or more RISs, whether the mobile device is within a near-field operational distance of the RIS based at least in part on:
• a determined near-field operational distance of the RIS, and
• a relative distance between the mobile device and the RIS

715

Conducting a positioning session for the mobile device, wherein:
• The positioning session includes measurements made by the mobile device of radio frequency (RF) signals reflected from at least one RIS of the one or more RISs, and
• The measurements made by the mobile device are based, at least in part, on whether the mobile device is within the respective near-field operational distance of the at least one RIS of the one or more RISs

720

Determining an RIS-assisted position of the mobile device based on the measurements made by the mobile device

730

Providing the determined RIS-assisted position of the mobile device

FIG. 7

NEAR/FAR-FIELD DETERMINATION OF RECONFIGURABLE INTELLIGENT SURFACE (RIS) FOR MOBILE DEVICE POSITIONING

RELATED APPLICATIONS

This application is a National Phase entry of International Application No. PCT/US2022/070422, filed Jan. 28, 2022, entitled "NEAR/FAR-FIELD DETERMINATION OF RECONFIGURABLE INTELLIGENT SURFACE (RIS) FOR MOBILE DEVICE POSITIONING" which claims the benefit of Greek Application No. 20210100114, filed Feb. 25, 2021, entitled "NEAR/FAR-FIELD DETERMINATION OF RECONFIGURABLE INTELLIGENT SURFACE (RIS) FOR MOBILE DEVICE POSITIONING", both of which are assigned to the assignee hereof, and incorporated herein in their entirety by reference.

BACKGROUND

1. Field of Invention

The present invention relates generally to the field of wireless communications, and more specifically to determining the location or position of an mobile device with radio frequency (RF) signals.

2. Description of Related Art

In a wireless communication network, the position of a mobile device may be determined by using the mobile device to measure RF signals transmitted by transmitting devices of the wireless communication network. New techniques are being developed for utilizing a Reconfigurable Intelligent Surface (RIS) in this type of position determination, where the mobile device measures RF signals transmitted by one or more transmitting devices and reflected from one or more RISs. Using RISs in this manner can improve accuracy and/or availability of this type of network-based positioning of the mobile device.

The measurements made by the mobile device to perform this type of network-based positioning typically assume the mobile device is far enough away from the transmitting devices and RISs that near-field transmission effects do not apply. But this may not always be the case. For example, because RISs may be used indoors to improve the wireless network coverage in a room or other relatively small area, they may be in close proximity to the mobile device, where near-field effects may need to be considered.

BRIEF SUMMARY

An example method of determining reconfigurable intelligent surface (RIS) operation for RIS-assisted position determination of a mobile device in a wireless communications system, according to this disclosure, comprises determining, for one or more RISs, whether the mobile device is within a near-field operational distance of the MS based at least in part on: a determined near-field operational distance of the RIS, and a relative distance between the mobile device and the MS. The method also comprises conducting a positioning session for the mobile device, wherein the positioning session includes measurements made by the mobile device of radio frequency (RF) signals reflected from at least one RIS of the one or more RISs, and the measurements made by the mobile device are based, at least in part, on whether the mobile device is within the respective near-field operational distance of the at least one RIS of the one or more RISs The method also comprises determining an RIS-assisted position of the mobile device based on measurements made by the mobile device. The method also comprises providing the determined RIS-assisted position of the mobile device.

An example device for determining reconfigurable intelligent surface (RIS) operation for RIS-assisted position determination of a mobile device in a wireless communications system, according to this disclosure, comprises a transceiver, a memory, and one or more processing units communicatively coupled with the transceiver and the memory. The one or more processing units configured to determine, for one or more RISs, whether the mobile device is within a near-field operational distance of the RIS based at least in part on a determined near-field operational distance of the RIS, and a relative distance between the mobile device and the RIS. The one or more processing units are also configured to conduct a positioning session for the mobile device, wherein the positioning session includes measurements made by the mobile device of radio frequency (RF) signals reflected from at least one RIS of the one or more RISs, and the measurements made by the mobile device are based, at least in part, on whether the mobile device is within the respective near-field operational distance of the at least one RIS of the one or more RISs; The one or more processing units are also configured to determine an RIS-assisted position of the mobile device based on measurements made by the mobile device. The one or more processing units are also configured to provide the determined RIS-assisted position of the mobile device.

Another example device for determining reconfigurable intelligent surface (RIS) operation for RIS-assisted position determination of a mobile device in a wireless communications system, according to this disclosure, comprises means for determining, for one or more RISs, whether the mobile device is within a near-field operational distance of the RIS based at least in part on: a determined near-field operational distance of the RIS, and a relative distance between the mobile device and the RIS. The device also comprises means for conducting a positioning session for the mobile device, wherein the positioning session includes measurements made by the mobile device of radio frequency (RF) signals reflected from at least one RIS of the one or more RISs, and the measurements made by the mobile device are based, at least in part, on whether the mobile device is within the respective near-field operational distance of the at least one RIS of the one or more RISs. The device also comprises means for determining an RIS-assisted position of the mobile device based on measurements made by the mobile device. The device also comprises means for providing the determined RIS-assisted position of the mobile device.

An example non-transitory computer-readable medium, according to this disclosure, stores instructions for determining reconfigurable intelligent surface (RIS) operation for RIS-assisted position determination of a mobile device in a wireless communications system. The instructions comprising code for determining, for one or more RISs, whether the mobile device is within a near-field operational distance of the RIS based at least in part on: a determined near-field operational distance of the RIS, and a relative distance between the mobile device and the RIS. The instructions also comprise code for conducting a positioning session for the mobile device, wherein the positioning session includes measurements made by the mobile device of radio frequency (RF) signals reflected from at least one RIS of the one or more RISs, and the measurements made by the mobile device are based, at least in part, on whether the mobile device is within the respective near-field operational distance of the at least one RIS of the one or more RISs. The instructions also comprise code for determining an RIS-assisted position of the mobile device based on measurements made by the mobile device. The instructions also comprise code for providing the determined RIS-assisted position of the mobile device.

BRIEF DESCRIPTION OF THE DRAWINGS

FIG. 7 is a flow diagram of a method of determining RIS operation for RIS-assisted position determination of a mobile device in a wireless communications system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Figure 1:
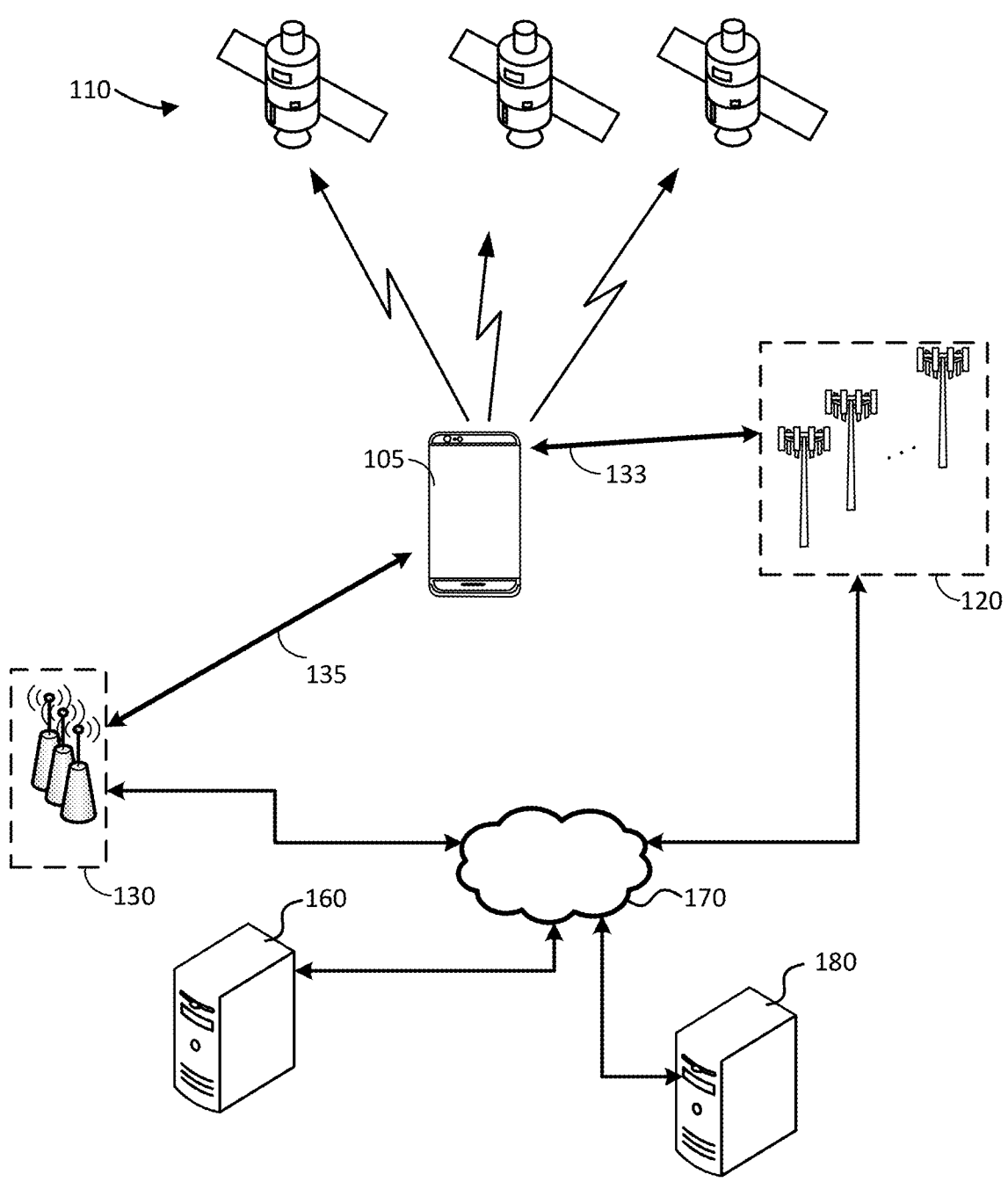
FIG. 1 is a diagram of a positioning system, according to an embodiment.

FIG. 1 is a simplified illustration of a positioning system 100 in which a user equipment (UE) 105, location server 160, and/or other components of the positioning system 100 can use the techniques provided herein for making a reconfigurable intelligent surface (RIS)-assisted position determination of the UE 105 and further determining whether the UE 105 is within a near-field operational distance of one or more RISs, according to an embodiment. It can be noted, however, that techniques described herein are not necessarily limited to a positioning system 100. The techniques described herein may be implemented by one or more components of the positioning system 100. The positioning system 100 can include a UE 105, one or more satellites 110 (also referred to as space vehicles (SVs)) for a Global Navigation Satellite System (GNSS) such as the Global Positioning System (GPS), base stations 120, access points (APs) 130, location server 160, network 170, and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." Physical transmission points may comprise an array of antennas (e.g., as in a Multiple Input-Multiple Output (MIMO) system and/or where the base station employs beamforming) of the base station. The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE 105 and a neighbor base station whose reference RF signals the UE 105 is measuring.

As used herein, the term "cell" may generically refer to a logical communication entity used for communication with a base station 120 and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate the location determination. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LNIF) that supports location of UE 105 using a control plane (CP) location solution for NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. Moreover, in some embodiments, location of the UE 105 estimated at least in part based on measurements of RF signals communicated between the UE 105 and one or more other UEs (not shown in FIG. 1), which may be mobile. Direct communication between UEs in this manner may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may also be specified as a geodetic location (as a latitude and longitude) or as a civic location (e.g. in terms of a street address or using other location related names and labels). A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

As previously noted, the example positioning system 100 can be implemented using a wireless communication network, such as an LTE-based or 5G NR-based network. 5G NR is a wireless RF interface undergoing standardization by the 3rd Generation Partnership Project (3GPP). 5G NR is poised to offer enhanced functionality over previous generation (LTE) technologies, such as significantly faster and more responsive mobile broadband, enhanced conductivity through Internet of Things (IoT) devices, and more. Additionally, 5G NR enables new positioning techniques for UEs, including Angle of Arrival (AoA)/Angle of Departure (AoD) positioning, UE-based positioning, and multi-cell Round Trip signal propagation Time (RTT) positioning. With regard to RTT positioning, this involves taking RTT measurements between the UE and multiple base stations.

Figure 2:
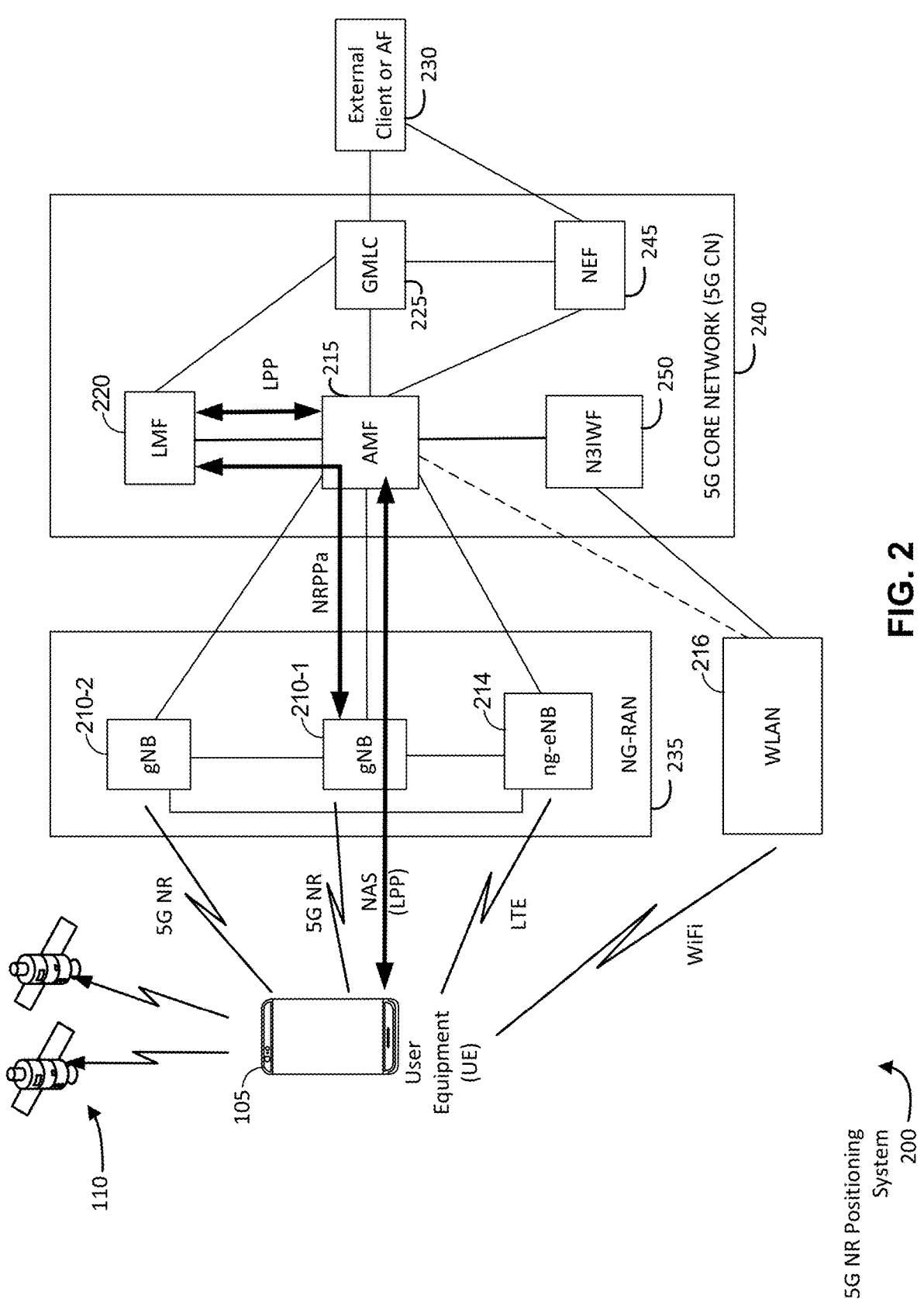
FIG. 2 is a diagram of a 5th Generation (5G) New Radio (NR) positioning system, illustrating an embodiment of a positioning system (e.g., the positioning system of FIG. 1) implemented within a 5G NR communication system.

FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. Standardization of an NG-RAN and 5G CN is ongoing in 3GPP. Accordingly, NG-RAN 235 and 5G CN 240 may conform to current or future standards for 5G support from 3GPP. The 5G NR positioning system 200 may further utilize information from GNSS satellites 110 from a GNSS system like Global Positioning System (GPS) or similar system. Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, WLANs 216, Access and Mobility Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225).

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210) and/or an antenna of a gNB. Pairs of gNBs 210 in NG-RAN 235 may be connected to one another (e.g., directly as shown in FIG. 2 or indirectly via other gNBs 210). Access to the 5G network is provided to UE 105 via wireless communication between the UE 105 and one or more of the gNBs 210, which may provide wireless communications access to the 5G CN 240 on behalf of the UE 105 using 5G NR. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate indirectly via another component of the 5G NR positioning system 200, such as the LMF 220.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink and downlink control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250—e.g. if WLAN 216 is a trusted WLAN for 5G CN 240. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information for multiple RATs from the LMF 220, take measurements for one of the multiple RATs (e.g., measurements of the UE 105) and/or obtain measurements from the UE 105 that are transferred to the access node using one or more of the multiple RATs. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5G CN 240 in FIG. 2. The methods and techniques described herein for UE 105 positioning using common or generic positioning procedures may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematics (RTK), Precise Point Positioning (PPP), Differential GNSS (DGNSS), ECID, angle of arrival (AoA), angle of departure (AoD), WLAN positioning, and/or other positioning procedures and methods. The LMF 220 may also process location services requests for the UE 105, e.g., received from the AMF 215 or from the GMLC 225. The LMF 220 may be connected to AMF 215 and/or to GMLC 225. The LMF 220 may be referred to by other names such as a Location Manager (LM), Location Function (LF), commercial LMF (CLMF), or value added LMF (VLMF). In some embodiments, a node/system that implements the LMF 220 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE's location) may be performed at the UE 105 (e.g., by processing downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220 or may forward the location request directly to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230. The GMLC 225 is shown connected to both the AMF 215 and LMF 220 in FIG. 2 though only one of these connections may be supported by 5G CN 240 in some implementations.

As further illustrated in FIG. 2, the LMF 220 may communicate with the gNBs 210 and/or with the ng-eNB 214 using the LPPa protocol (which also may be referred to as NRPPa or NPPa). LPPa protocol in NR may be the same as, similar to, or an extension of the LPPa protocol in LTE (related to LTE Positioning Protocol (LPP)), with LPPa messages being transferred between a gNB 210 and the LMF 220, and/or between an ng-eNB 214 and the LMF 220, via the AMF 215. As further illustrated in FIG. 2, LMF 220 and UE 105 may communicate using the LPP protocol. LMF 220 and UE 105 may also or instead communicate using an LPP protocol (which, in NR, also may be referred to as NRPP or NPP). Here, LPP messages may be transferred between the UE 105 and the LMF 220 via the AMF 215 and a serving gNB 210-1 or serving ng-eNB 214 for UE 105. For example, LPP and/or LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP and/or LPP protocol may be used to support positioning of UE 105 using UE assisted and/or UE based position methods such as A-GNSS, RTK, TDOA and/or Enhanced Cell ID (ECID). The LPPa protocol may be used to support positioning of UE 105 using network based position methods such as ECID (e.g., when used with measurements obtained by a gNB 210 or ng-eNB 214) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use LPPa and/or LPP to obtain a location of UE 105 in a similar manner to that just described for UE 105 access to a gNB 210 or ng-eNB 214. Thus, LPPa messages may be transferred between a WLAN 216 and the LMF 220, via the AMF 215 and N3IWF 250 to support network-based positioning of UE 105 and/or transfer of other location information from WLAN 216 to LMF 220. Alternatively, LPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using LPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

With a UE-assisted position method, UE 105 may obtain location measurements and send the measurements to a location server (e.g., LMF 220) for computation of a location estimate for UE 105. Location measurements may include one or more of a Received Signal Strength Indication (RSSI), RTT, Reference Signal Receive Power (RSRP), Reference Signal Received Quality (RSRQ), Time of Arrival (ToA), AoA, Differential AoA (DAoA), AoD, or Timing Advance (TA) for gNBs 210, ng-eNB 214, and/or one or more access points for WLAN 216. The location measurements may also or instead include measurements of RAT-independent positioning methods such as GNSS (e.g., GNSS pseudorange, GNSS code phase, and/or GNSS carrier phase for GNSS satellites 110), WLAN, etc. With a UE-based position method, UE 105 may obtain location measurements (e.g., which may be the same as or similar to location measurements for a UE assisted position method) and may further compute a location of UE 105 (e.g., with the help of assistance data received from a location server such as LMF 220 or broadcast by gNBs 210, ng-eNB 214, or WLAN 216). With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or ToA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

In a 5G NR positioning system 200, some location measurements taken by the UE 105 (e.g., AoA, AoD, ToA) may use RF signals (reference signals) received from base stations 210 and 214. These signals may comprise PRS, which can be used, for example, to execute TDOA, AoD, and RTT-based positioning of the UE 105. Other reference signals that can be used for positioning may include Cell-specific Reference Signal (CRS), Channel State Information Reference Signal (CSI-RS), synchronization signals (e.g., synchronization signal block (SSB) Synchronizations Signal (SS)), etc. Moreover, the signals may be transmitted in a Tx beam (e.g., using beamforming techniques), which may impact angular measurements, such as AoD.

Figure 3:
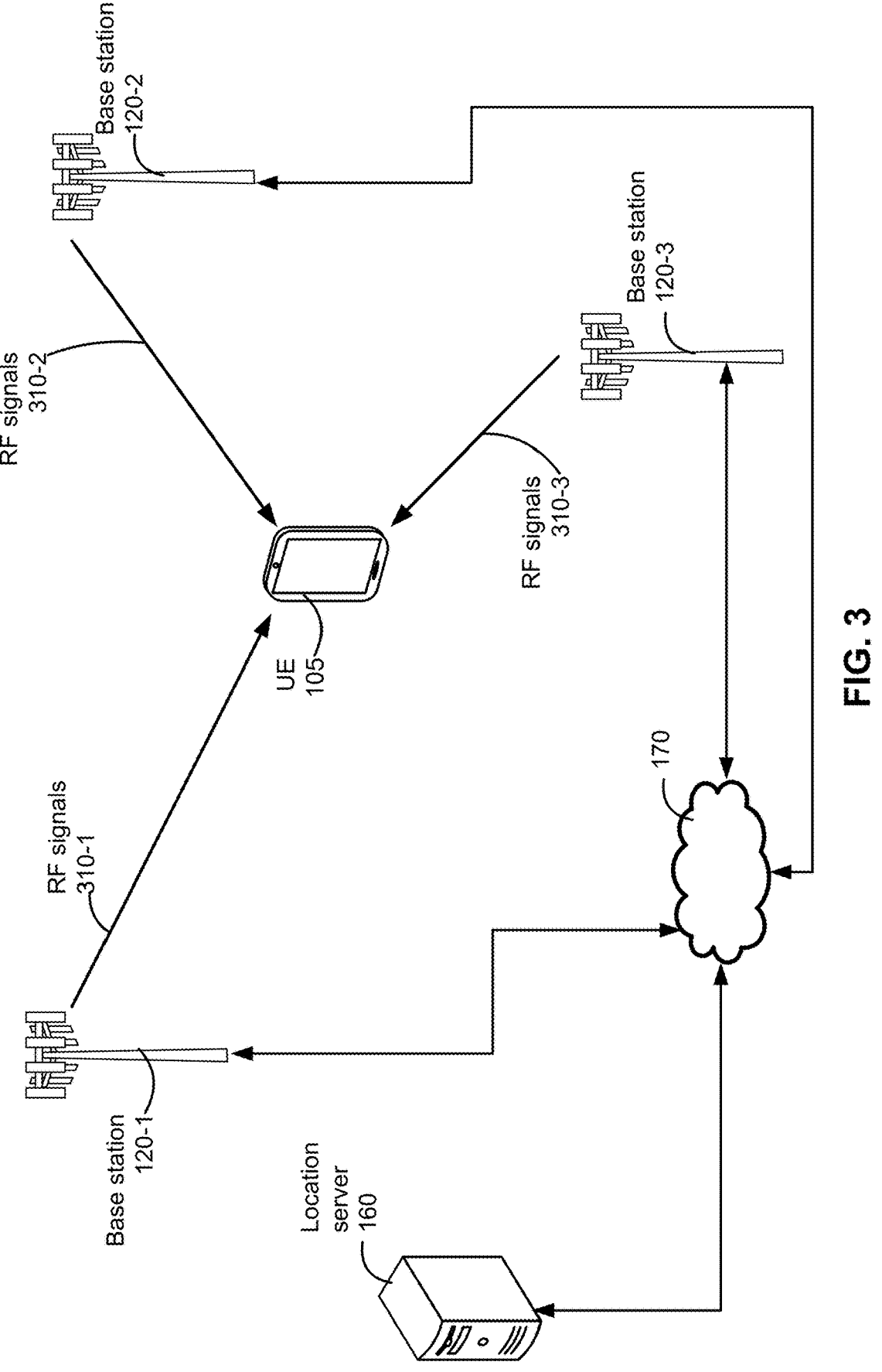
FIG. 3 is a simplified diagram of a configuration of a positioning system, illustrating how positioning of a user equipment (UE) may be performed without the use of Reconfigurable Intelligent Surfaces (MSs).

FIG. 3 is a simplified diagram of a configuration of a positioning system, illustrating how positioning of a UE 105 may be performed without the use of RISs. Unlabeled arrows represent communication links. Communication between the UE 105 and a location server 160 may occur via one or more of the base stations 120 or via another communication link (not shown) between the UE 105 and network 170. Here, each base station 120 (which may correspond with a gNB 210 and/or ng-eNB 214 of FIG. 2) transmits respective RF signals 310, which are measured by the UE 105. The location server 160 can determine a type of positioning to perform (e.g., OTDOA, AoD, RTT, etc.) and coordinate the transmission of the RF signals 310 by the base stations 120 and the measurement of the RF signals 310 by the UE 105 via communication with the base stations 120 and UE 105. The type of measurements made by the UE 105 may vary, depending on the type of positioning performed. Using measurements of the RF signals 310 taken by the UE 105 and known locations of the base stations 120, a location of the UE 105 can be determined geometrically, for example, using multilateration and/or multiangulation techniques. As noted previously, for UE-assisted positioning, this determination may be made by the location server 160, in which case the measurements may be provided to the location server 160 by the UE 105. For UE-based positioning, this determination may be made by the UE 105.

Figure 4:
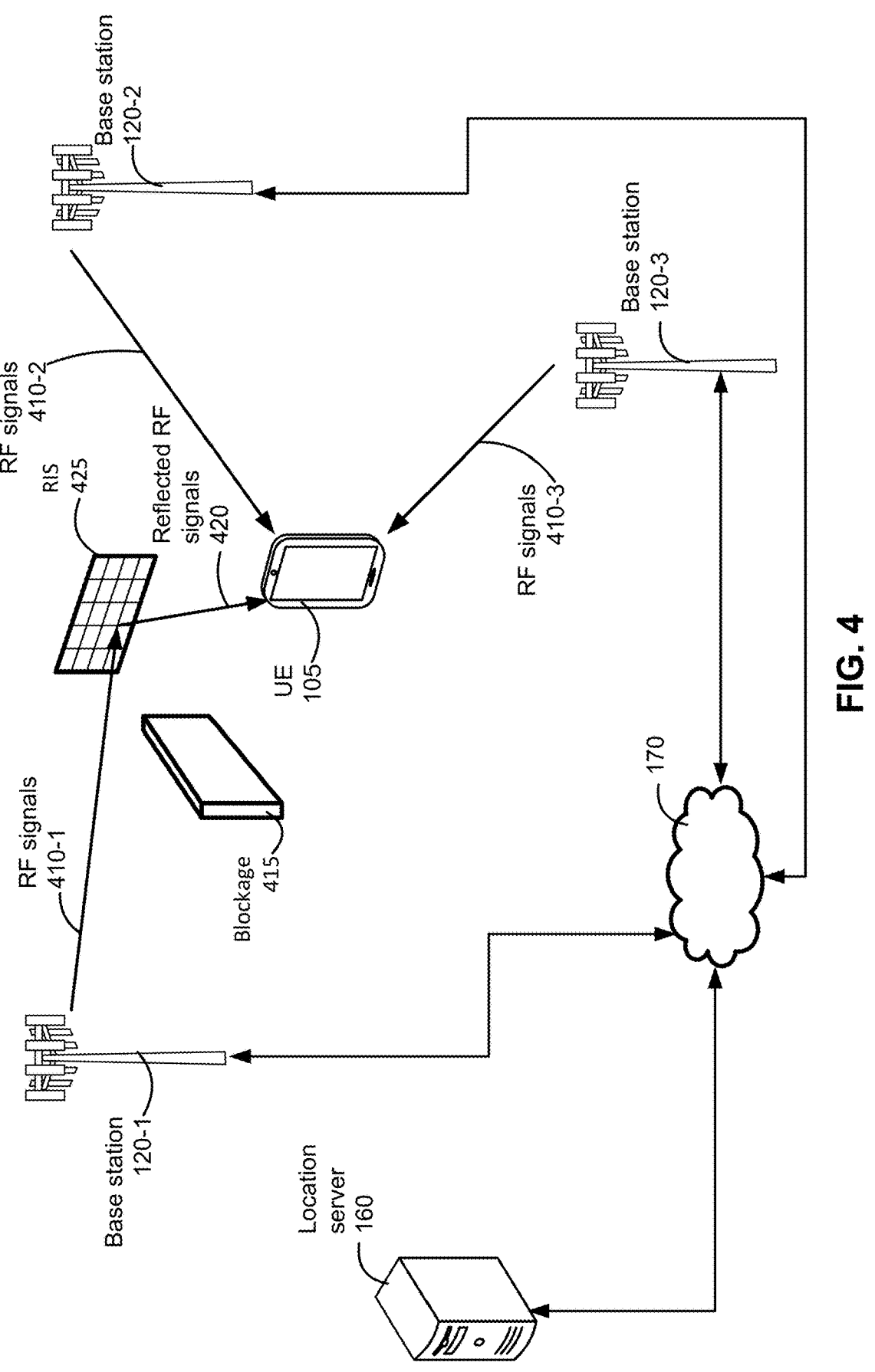
FIG. 4 is a simplified diagram of a configuration in which positioning of a UE may be made with the assistance of an RIS, according to an embodiment.

FIG. 4 is a simplified diagram of a configuration in which positioning of a UE 105 may be made with the assistance of an RIS 425, according to an embodiment. (As used herein, "RIS-assisted" positioning of a UE 105 refers to positioning of the UE 105 with the use of an RIS 425.) Similar to the configuration of FIG. 3, a location server 160 coordinates the positioning of the UE 105 through the use of the transmission of RF signals 410 by the base stations 120, and the measurement of those signals by the UE 105. Here, however, a blockage 415 is situated between a first base station 120-1 and the UE 105. Because of this, the UE 105 may essentially be in a "blind spot" of the base station 120-1, where signals transmitted by the base station 120-1 would be unable to reach the UE 105. The RIS 425, however, can help alleviate issues arising from the blockage 450.

RISs (which also may be referred to as a software-controlled metasurfaces, intelligent reflecting surfaces, or reconfigurable reflect arrays/metasurfaces.) are garnering recent attention in wireless communication applications as a means to enable propagation paths for RF signals around blockage. Although the RIS 425 may be a passive device, it may comprise an array and may therefore redirect RF signals using beamforming. As such, the RIS 425 can enable wireless coverage of the base station 120 (or, more broadly, the wireless network of the base station 120) to extend to otherwise unreachable areas. The RIS 425 can do this using a software-controlled reflection/scattering profile to redirect wireless signals toward the UE 105 in real time. Additionally or alternatively, an RIS 425 may act as a repeater by receiving signals transmitted by a base station 120-1 and directing them toward a UE 105. (As used herein, "directing," "redirecting," "reflecting," and similar terms used when referring to the functionality of the RIS 425 may refer to the reflecting and/or repeating functionality of an MS.) The functionality of the MS 425 can be controlled by the base station 120-1 using a control channel, although alternative embodiments may enable a location server 160 and/or UE 105 to control the MS 425. In any case, this adds controllable paths to the channel between the base station 120-1 and UE 105, which is useful in environments with severe blockage 415. Thus, for positioning purposes, RF signals 410-1 may be transmitted to the MS 425, enabling the UE 105 to measure the reflected RF signals 420. According to various positioning techniques, the positioning of the UE 105 can be made using a similar process as in the configuration of FIG. 3, but with additional information regarding the location of the RIS 425.

It can be noted that the configuration illustrated in FIG. 4 is provided simply as an example. In other configurations, multiple blockages may exist, and multiple RISs may be used to facilitate communication with and/or positioning of the UE 105. Moreover, according to some embodiments, positioning using an RIS 425 may also be performed without a blockage 415. That is, the beamforming capabilities and antenna sensitivity of an RIS 425 may be advantageous for accurate positioning of the UE 105. Thus, the MS 425 may be used for the positioning of the UE 105 even if there is no blockage 415 that would otherwise block RF signals transmitted by the base station 120-1 from reaching the UE 105.

As previously indicated, positioning of a UE 105 (e.g., using configurations shown in FIG. 3 or 4) typically assumes the UE 105 is operating within a far-field operational distance from the base station 120 and RIS 425. And although this typically may be the case for most base stations 120, this may not always be the case for RISs 425. As noted, an MS often may be used in a building to reflect signals to a room or other relatively small indoor area. Moreover, given common dimensions of RISs and operational 5G NR frequencies, a boundary between near-field and far-field operational distance of an RIS may be between 10 and 20 m, for example. Accordingly, a UE 105 in a room or other indoor area served by an MS may be within a near-field operational distance of the MS.

For an antenna or antenna array larger than a half-wavelength of a radio wave it emits, near and far fields may be defined in terms of the Fraunhofer distance:

$$d_F = \frac{2D^2}{\lambda}, \tag{1}$$

where D is the largest dimension of the radiator (or the diameter of the antenna or antenna array), and $\lambda$ is the wavelength of the radio wave (e.g., the carrier frequency of a transmitted RF signal). If a receiving device (e.g., UE 105) is located less than the Fraunhofer distance away from the antenna or antenna array (e.g., base station 120 or RIS 425 reflecting the RF signal), then it may be considered to be within the near-field operational distance of the antenna or antenna array. Otherwise, it is considered to be in the far-field operational distance.

In a near-field scenario, an RF signal wave front arriving at the receiving device has curvature. Thus, for positioning purposes of a UE 105, this allows for different measurements to be made. For example, a unique coordinate of the UE 105 can be determined, based at least in part on the curvature. In the far-field scenario, however, the wavefront has no curvature, so traditional measurements (e.g., TDOA, RTT, AoD, and AoA) may then be used.

A UE 105 may be capable of taking near-field measurements, far-field measurements, or both. Thus, whether or not an RIS 425 can be used for positioning of the UE 105 may depend not only on whether the UE 105 is within a near-field or far-field operational distance of the RIS 425, but also the capabilities of the UE 105 for taking near-field or far-field measurements.

Embodiments herein address these and other issues by identifying whether a UE is within a near-field operational distance of one or more RISs, determining the UE's capability and (optionally) preference for near-field and/or far-field operation, and conducting RIS-assisted positioning of the UE based on this information. This can apply for both UE-based and UE-assisted positioning. Embodiments are described hereinafter and illustrated in FIGS. 5 and 6.

Figure 5:
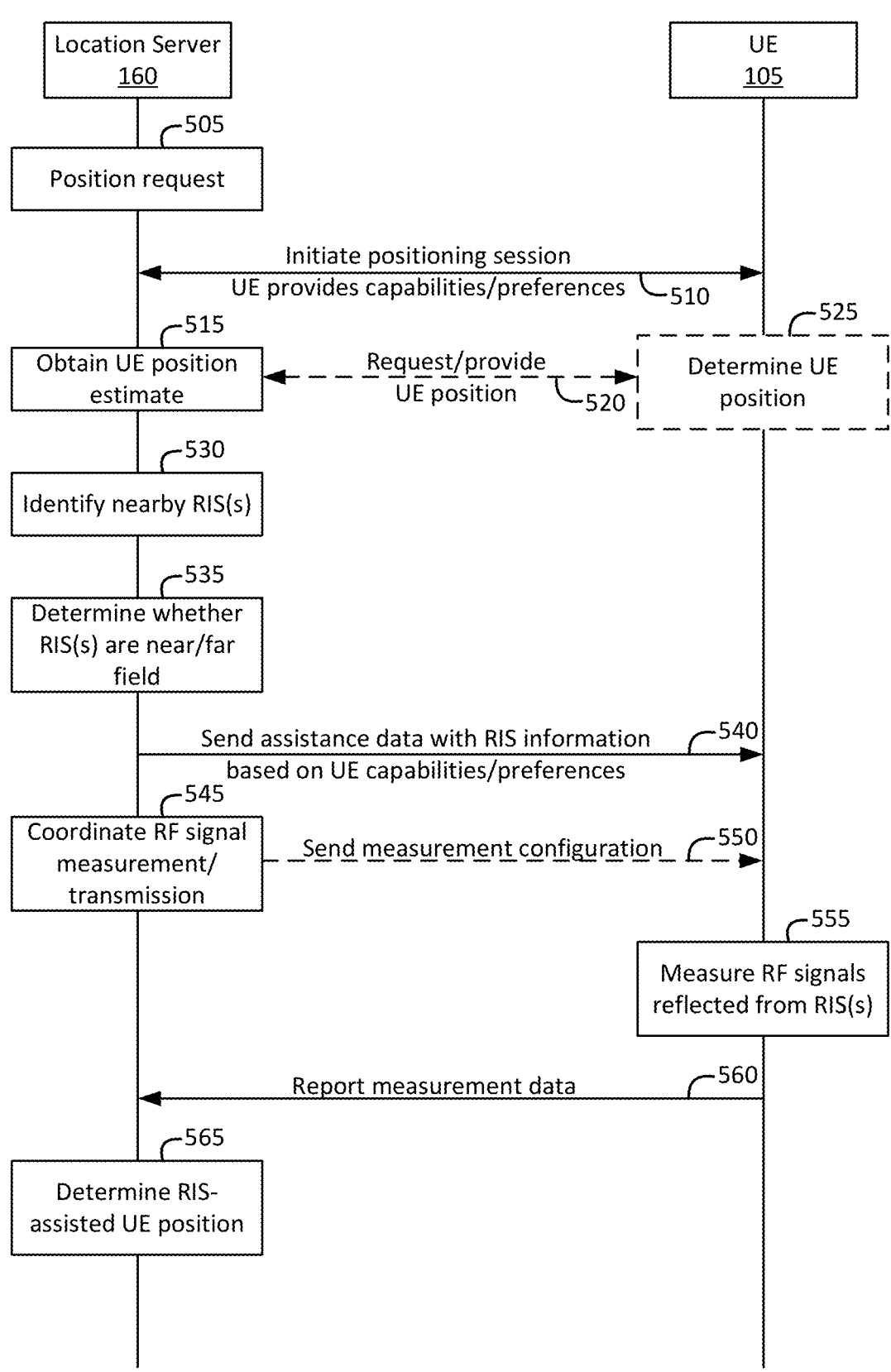
FIGS. 5 and 6 are a call-flow diagram illustrating embodiments processes of determining RIS operation for RIS-assisted position determination a UE.

FIG. 5 is a call-flow diagram illustrating an embodiment of a process of determining RIS operation for MS-assisted position determination a UE. As with the other figures provided herein, FIG. 5 is provided as a nonlimiting example. As discussed in more detail below, alternative embodiments may perform certain functions in a different order, simultaneously, etc. It can be noted that arrows between the UE 105 and a location server 160 in FIG. 5 illustrate messages or information sent from one component to another. Further (although not explicitly indicated in FIG. 5), these communications between the location server 160 and UE 105 may occur via any number of intervening components, which may include, a computer server, base station, RIS, and/or other component or device of a wireless communication network. As previously noted, communication between a UE 105 and location server 160 within a 5G NR network may utilize LPP protocol.

The process illustrated in FIG. 5 may comprise UE-assisted positioning of the UE 105. As such, the process can begin at block 505, where the location server 160 receives a position request. As noted, a position request received by a location server 160 may comprise a request from an external client 180 or external client or AF 230. The location server 160 can then initiate a positioning session with the UE 105, as indicated by arrow 510. As part of the exchange between the location server 160 and UE 105, the UE 105 can provide its capabilities, and optionally preferences, with regard to near-field and far-field operation. This can be in response to a request by the location server 160 for the capabilities (and, optionally, the preferences).

The way in which the UE provides its capabilities may vary, depending on desired functionality. Because far-field functionality has been supported by legacy positioning systems, a UE's capability for far-field operation may be assumed, according to some embodiments. In such embodiments, the UE 105 may simply indicate whether it is capable of taking near-field measurements or positioning. According to other embodiments, however, the UE 105 may indicate its capabilities for either or both near-field operation and far-field operation.

With regard to preferences, if the UE 105 is capable of both near-field and far-field measurements, the UE 105 can provide a preferred positioning mode to indicate whether it prefers near-field or far-field measurements under certain circumstances. For example, if multiple RISs are available for positioning, where the UE is in a near-field operational distance from some RISs and a far-field operational distance from other RISs, positioning can be performed based on the UEs preferences. Near-field measurements, for example, may provide more power saving, but may result in a less accurate position estimate for the UE 105 if fewer RISs are available for measurements. On the other hand, far-field measurements may result in higher accuracy/more available RISs but may also result in more power consumption. Thus, for a given positioning session, the UE 105 may indicate its preference, based on a desired balance between accuracy and power consumption.

Because the UE 105 may be operated in different scenarios, this indication could be dynamic. For example, to save power, a UE 105 can change its preferred positioning mode. In such instances, the UE may not be expected to continue an ongoing positioning measurement/report. Thus, the preference indication could be sent by the UE 105 as an early-stop of some scheduled reference signal transmissions transmission and related measurement reports. According to some embodiments, it may be signaled through Downlink Control Information (DCI) or Media Access Control-Control Element (MAC-CE).

At block 515, the functionality comprises obtaining UE position estimate, which is used to identify nearby RISs. The way in which the UE position estimate is obtained may vary, depending on various factors. According to some embodiments, for example, the location server 160 may have a recent position estimate for the UE, in which case the recent position estimate may be sufficient. For example, if a recent position estimate has been received within a threshold period of time (e.g., five seconds, 10 seconds, 20 seconds, etc.), then the location server 160 may deem the recent position estimate to be sufficient for determining nearby RISs. Alternatively, as indicated in FIG. 5, the location server 160 can request the UE position from the UE (as indicated at arrow 520), which may determine its position, as shown at block 525. Here, if the UE 105 determines its position, the determined position may be using a non-RIS-assisted technique, such as GNSS-based positioning, legacy network-based positioning, positioning that is partly based on an inertial measurement unit (IMU) or similar motion detection, etc.

Once the UE position estimate is obtained, the location server 160 can then identify nearby RISs, as indicated at block 530. According to some embodiments, the location of RISs used in a coverage area supported by the location server 160 can be stored by the location server 160 in a database, almanac, etc. Thus, the location server 160 can identify nearby RISs simply by identifying RISs within a threshold distance of the UE position estimate.

At block 535, the location server 160 then determines whether the UE is located within near or far field for each identified MS. According to some embodiments, a UE may be assumed to be at a far-field operational distance from each RIS, unless the UE is determined to be within the Fraunhofer distance of the MS (e.g., as determined by equation (1)).

As noted, this determination can depend on the size of a RIS and the carrier frequency of RF signals used for positioning of the UE 105. Accordingly, the location server 160 can make this determination based on known information about the size of the MS (which can be maintained in the same manner and/or same database as the location of the MS). Additionally, the location server 160 can determine an carrier frequency with which a base station is to transmit RF signals (e.g., PRS signals), to determine the Fraunhofer distance.

As shown by arrow 540, the location server can then send assistance data with RIS information to the UE 105, where the RIS information is based on UE capabilities and, optionally, preferences. This assistance data can include, for example, and RIS ID and location for each RIS to be used in the positioning of the UE 105. Further, the assistance data may indicate whether the UE 105 is in a near-field operational distance or a far-field operational distance from each RIS. To reduce signaling overhead, groupwise indications may be made regarding whether RISs are near field or far field. This can allow the UE 105 to measure the RF signals reflected by each RIS in the proper way by taking near-field or far-field measurements. Additionally or alternatively, as previously noted, the location server 160 may choose to provide assistance data for only a subset of RISs, based on preferences provided by the UE 105 at arrow 510. If a UE is only capable of taking far-field measurements, then, according to some embodiments, the location server 160 may only provide assistance data regarding RISs for which the UE 105 is at a far-field operational distance. Similarly, if the UE is only capable of taking near measurements, then, according to some embodiments, the location server 160 may only provide assistance data regarding RISs for which the UE 105 is at a near-field operational distance.

At block 545, the location server can coordinate RF signal measurement/transmission. This may comprise configuring one or more base stations (not shown) to transmit RF signals (e.g., PRS) for positioning, providing one or more RISs (not shown) with information regarding the location of the UE 105 to allow the RISs to direct the RF signals toward the UE 105, and/or providing information to the UE 105 (e.g., by sending measurement configuration at arrow 550) regarding when to make the measurements of the RF signals. According to some embodiments, the configuration sent at arrow 550 may be combined with the assistance data provided to the UE 105 at arrow 540.

At block 555, the UE 105 measures the RF signals reflected from the one or more RISs for which the UE 105 received assistance data. Again, the type of measurements made may depend on the type of positioning (e.g., ToA-based, RTT-based, AoD-based, etc.), whether the UE 105 is within a near-field operational distance from an RIS from which measured RF signals were reflected, and/or other factors. These measurements can then be provided to the location server 160 in a report, as shown at arrow 560.

Finally, at block 565, the location server 160 can determine an RIS-assisted position of the UE 105, based at least in part on the measurements received in the measurement report at arrow 560. Again, this determination may be further based on known positions for base stations and/or RISs, using positioning techniques such as multilateration, multiangulation, or the like. The location server 160 can further provide the RIS-assisted UE position, for example, to a requesting entity (e.g., the entity making the position request at block 505).

It can be noted that variations to the process illustrated in FIG. 5 may occur, depending on the scenario. For example, if the location server 160 is unable to obtain a UE position estimate at block 515 sufficient to determine whether the UE 105 is within a near-field operational distance from each of one or more RISs (e.g., the location server 160 does not have a previous UE position estimate made within a threshold amount of time), then the location server 160 can provide the UE 105 with information regarding one or more RISs to allow the UE 105 to determine whether the UE is within a near-field operational distance from each of the one or more RISs. According to some embodiments, for example, the location server can obtain a rough position of the UE 105 based on a previous position estimate (e.g., made prior to the threshold amount of time), an identity and known location of a serving base station of the UE 105, or the like. Based on this rough location, the location server can identify nearby RISs (e.g., within a threshold distance, within the same cell served by the serving base station, etc.), and provide information regarding the RISs to allow the UE 105 to determine whether the UE is within a near-field operational distance from each of the one or more RISs. Similar functionality is illustrated in FIG. 6, which shows a process for UE-based positioning.

Figure 6:
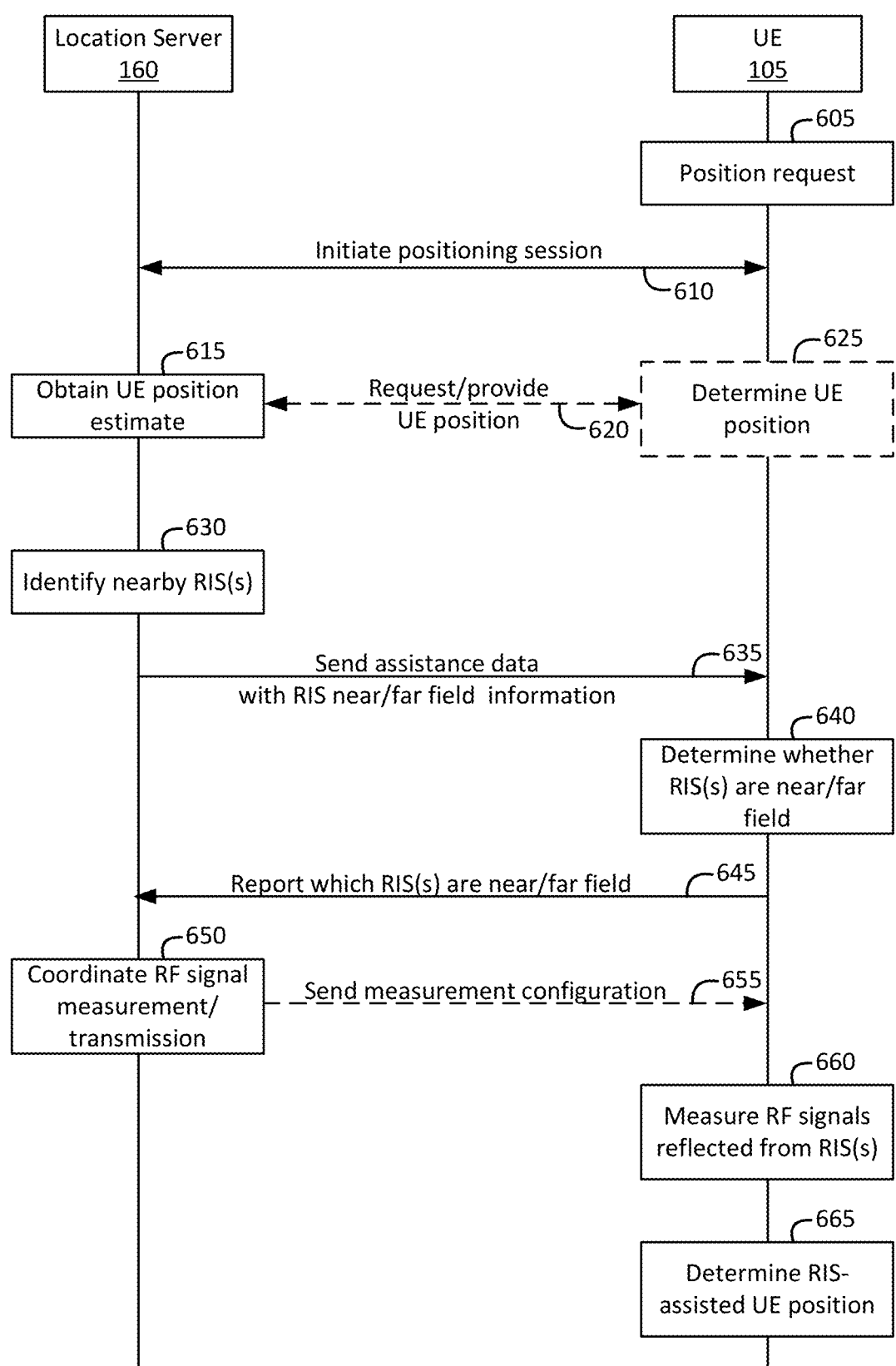

FIG. 6 is a call-flow diagram illustrating an embodiment of a process of determining RIS operation for MS-assisted position determination a UE, similar to FIG. 5. Here, however, the position determination is made by the UE 105, and therefore the MS-assisted position determination may be considered UE-based. As such, the process can begin at block 605, where the UE 105 receives a position request. Here, the position request received by the UE 105 may comprise a request from a user of the UE 105, an application executed by the UE 105 (e.g., a web browser, navigation application, positioning application, etc.), or the like.

The UE 105 can then initiate a positioning session with the location server 160, as indicated by arrow 610. According to some embodiments, the UE may provide some indication of capabilities or preferences, similar to the process of FIG. 5.

At block 615, the location server 160 obtains a UE position estimate, which is used to identify nearby RISs. Because the location server 160 is not making near-field/far-field determinations regarding the location of the UE 105 with respect to RISs, the location does not need to be as accurate as the location of block 515 of FIG. 5. That is, as noted above, the location server 160 can obtain a rough estimate of the location of the UE 105 based on a previous position estimate (e.g., made prior to the threshold amount of time), an identity and known location of a serving base station of the UE 105, or the like. Optionally, as illustrated, the location server 160 can request a position of the UE 105, as illustrated at arrow 620, and the UE 105 can provide the UE position estimate, which may involve determining the UE position, as shown at block 625. Because a high accuracy may not be needed at this point, the UE 105 can determine a level of accuracy with regard to the position estimate it provides to the location server. This level of accuracy can accommodate privacy settings or other preferences of a user of the UE 105, for example.

At block 630 the functionality comprises identifying nearby RISs. Again, because the near-field/far-field determination is made by the UE 105 rather than the location server 160, the functionality at block 630 may simply be a determination of RISs within a threshold distance of the UE's position estimate, where the threshold distance is a distance that may allow RISs to be used in far field operation. Alternatively, as previously noted, RISs may be identified based on being located within or near a cell served by the serving base station of the UE 105.

The location server 160 then sends assistance data regarding the identified RISs to the UE 105, as indicated at block 635. Here, the assistance data includes information that enables the UE 105 to determine whether the UE is within a near-field or far-field operational distance of each MS. For example, the assistance data may include, for each RIS, an identifier (ID), location, and/or a diameter or largest dimension of the MS. In some embodiments, the assistance data may further include the carrier wavelength that may be used by a base station for transmitting the RF signals for positioning of the UE 105. This information can allow the UE 105 to determine the Fraunhofer distance for each MS. Alternatively, the location server 160 may determine the Fraunhofer distance for each RIS and include the Fraunhofer distance in the assistance data to the UE. In any case, the UE can use the assistance data to determine whether it is within a near-field or far-field operational distance of each RIS. By providing this information to the UE 105 and allowing the UE 105 to make the near-field/far-field determination, the process illustrated in FIG. 6 can allow the UE 105 to preserve privacy of the UE's location, because the location server 160 may only be able to obtain a rough position approximation for the UE position estimate (at block 615).

Once the near-field/far-field determination is made at block 640, the UE 105 can then report which RISs are near-field and which RISs are far-field, as shown at arrow

645. At block 650, the location server 160 can then coordinate RF signal measurement/transmission in a manner similar to the process previously described regarding block 545 in FIG. 5. That is, based on the UEs capabilities, and optional preferences, the location server 160 can coordinate the transmission and measurement of RF signals that use RISs in accordance with the capabilities and preferences of the UE 105. This process may include the location server 160 sending a measurement configuration to the UE 105, as indicated at arrow 655. Alternatively, according to some embodiments, the UE 105 may report near-field/far-field status for a subset of RISs, based on the UEs capabilities/preferences. For example, if the UE 105 is incapable of forming near-field measurements, it may report only the RISs for which the UE is at a far-field operational distance and excluding those for which the UE is at a near-field operational distance.

At block 660, the functionality comprises the UE 105 measuring RF signals reflected from the one or more RISs, as per the configuration provided by the location server 160. The functionality of this block can mirror the functionality of block 555 of FIG. 5, described previously. However, rather than reporting measurement data back to the location server 160, the process in FIG. 6 comprises the UE 105 determining the RIS-assisted UE position, as indicated at block 665. According to some embodiments, the UE 105 can then provide the RIS-assisted UE position to the location server 160, a user of the UE 105, an application executed by the UE 105 (e.g., from a lower functional layer of the UE 105 that makes the determination at block 665), or the like.

Figure 8:
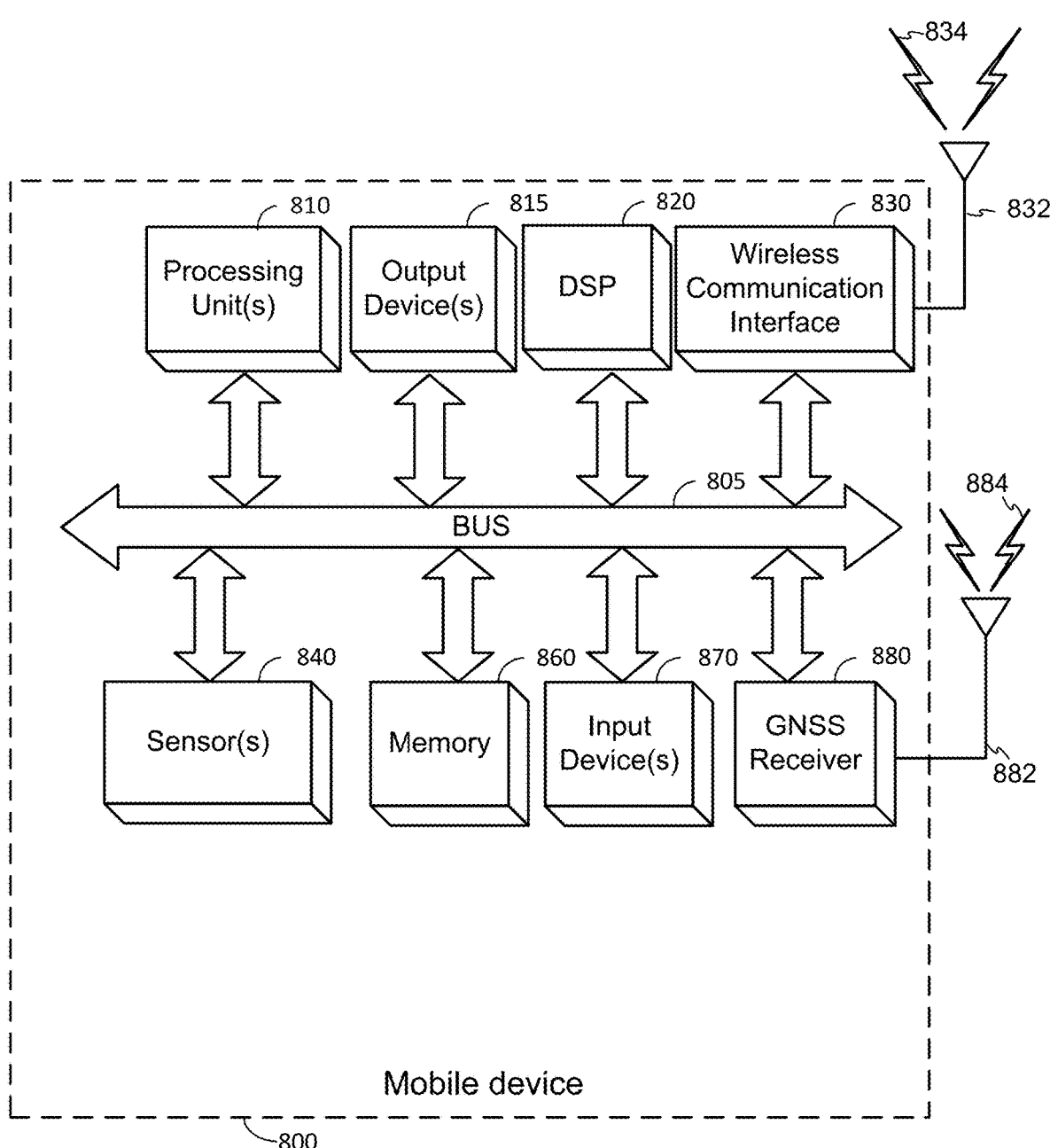
FIG. 8 is a block diagram of an embodiment of a mobile device, which can be utilized in embodiments as described herein.
Figure 9:
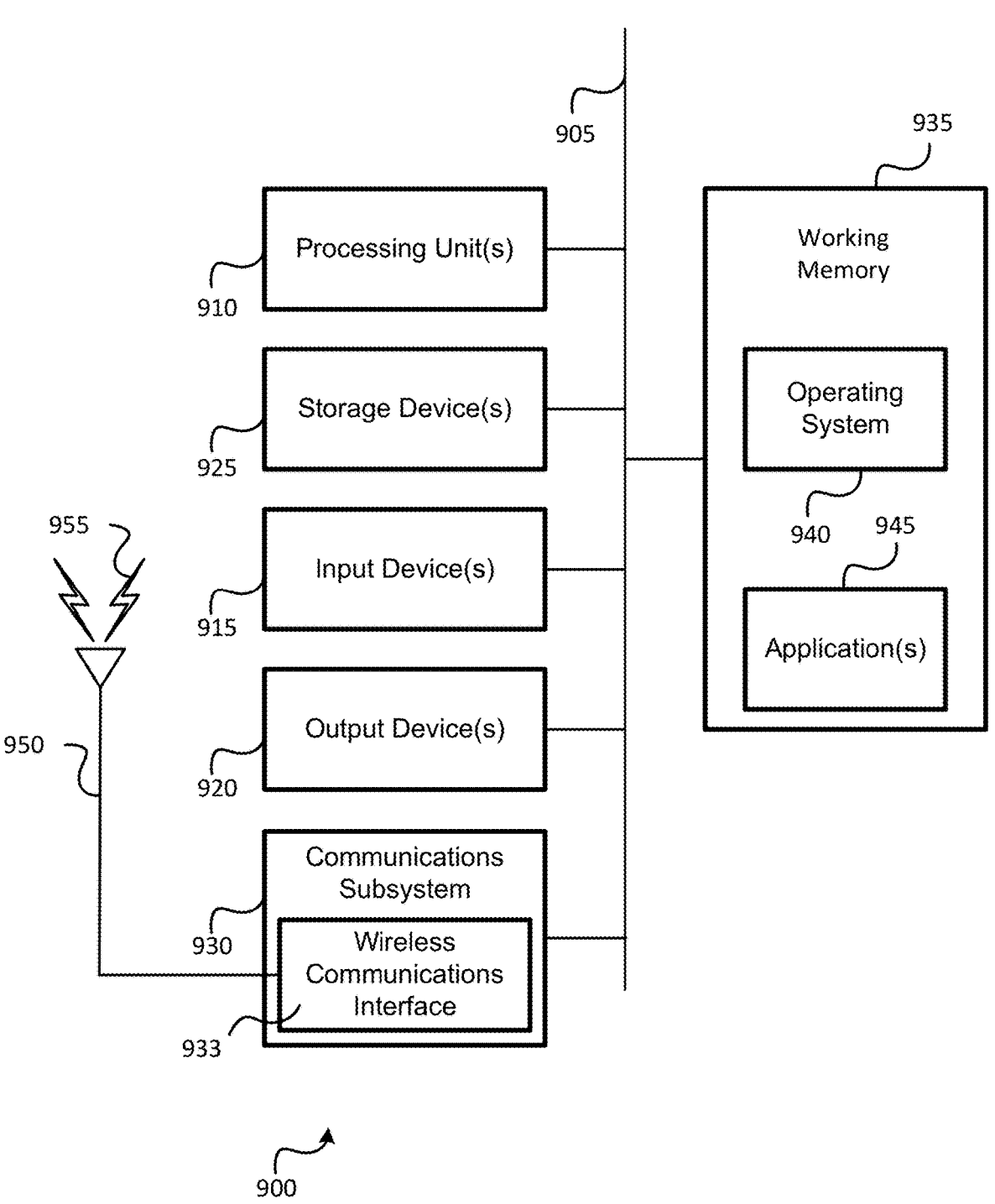
FIG. 9 is a block diagram of an embodiment of a computer system, which can be utilized in embodiments as described herein.

FIG. 7 is a flow diagram of a method 700 of determining MS operation for MS-assisted position determination of a mobile device in a wireless communications system, according to an embodiment. Means for performing the functionality illustrated in one or more of the blocks shown in FIG. 7 may be performed by hardware and/or software components of a mobile device (e.g., UE 105) or computer system (e.g., location server 160). Example components of a mobile device are illustrated in FIG. 8, an example components of a computer system are illustrated in FIG. 9, which are described in more detail below.

At block 710, the functionality comprises determining, for one or more RISs, whether the mobile device is within a near-field operational distance of the MS based at least in part on a determined near-field operational distance of the RIS, and a relative distance between the mobile device and the RIS. As illustrated in the processes shown in FIGS. 5 and 6 this determination can be performed by a UE or location server, depending, for example, whether the positioning of the UE is UE-based or UE-assisted. As explained in more detail below, the functionality at block 710 may vary, depending on the device executing the functionality. Means for performing functionality at block 710 may comprise, for example, a bus 805, processing unit(s) 810, Digital Signal Processor (DSP) 820, wireless communication interface 830, memory 860, and/or other components of a mobile device as illustrated in FIG. 8; or a bus 905, processing unit(s) 910, communications subsystem 930, working memory 935, and/or other components of a computer system as illustrated in FIG. 9.

At block 715, the functionality comprises conducting a positioning session for the mobile device, wherein (i) the positioning session includes measurements made by the mobile device of radio frequency (RF) signals reflected from at least one MS of the one or more RISs, and (ii) the measurements made by the mobile device are based, at least in part, on whether the mobile device is within the respective near-field operational distance of the at least one MS of the one or more RISs. The way in which the positioning session is conducted at block 715 may depend on whether the functionality of block 715 is performed by the mobile device or location server. For a location server, conducting the positioning session may comprise coordinating RF signal measurement/transmission, as indicated at block 545 of FIG. 5 and block 650 of FIG. 6. For a mobile device, conducting the positioning session may comprise taking the measurements of the RF signals reflected from the at least one RIS, as shown at block 555 of FIG. 5 and block 660 of FIG. 6. The type of measurements made by the mobile device may be near-field measurements or far-field measurements, depending on whether the mobile device is within the respective near-field operational distance of the at least one RIS of the one or more RISs. As such, the measurements made by the mobile device are based, at least in part, on whether the mobile device is within the respective near-field operational distance of the at least one RIS of the one or more RISs Means for performing functionality at block 715 may comprise, for example, a bus 805, processing unit(s) 810, Digital Signal Processor (DSP) 820, wireless communication interface 830, memory 860, and/or other components of a mobile device as illustrated in FIG. 8; or a bus 905, processing unit(s) 910, communications subsystem 930, working memory 935, and/or other components of a computer system as illustrated in FIG. 9.

At block 720, the functionality comprises determining an RIS-assisted position of the mobile device based on measurements made by the mobile device of RF signals reflected from at least one RIS of the one or more RISs. As previously noted, the type of measurements made may comprise ToA, power delay profile, or the like, and may depend on the type of positioning (e.g., TDOA-based, RTT-based, or AoD-based positioning). Moreover, the UEs ability to make these measurements for RF signals reflected from an RIS may depend on whether the UE is within a near-field operational distance or far-field operational distance of the MS, and whether the UE is capable of making near-field and/or far-field measurements. Means for performing functionality at block 720 may comprise, for example, a bus 805, processing unit(s) 810, DSP 820, wireless communication interface 830, memory 860, and/or other components of a mobile device as illustrated in FIG. 8; or a bus 905, processing unit(s) 910, communications subsystem 930, working memory 935, and/or other components of a computer system as illustrated in FIG. 9.

At block 730, the functionality comprises providing the determined RIS-assisted position of the mobile device. For embodiments in which the method 700 is performed by the mobile device, providing the determined MS-assisted position of the mobile device may comprise providing the determined MS-assisted position of the mobile device to a user of the mobile device or an application executed by the mobile device. For embodiments in which the method 700 is performed by a location server, the method 700 may further comprise receiving a request for a location of the mobile device from a requesting entity, and providing the determined RIS-assisted position of the mobile device may comprise providing the determined RIS-assisted position of the mobile device to the requesting entity. Means for performing functionality at block 730 may comprise, for example, a bus 805, processing unit(s) 810, DSP 820, wireless communication interface 830, memory 860, and/or other components of a mobile device as illustrated in FIG. 8; or a bus 905, processing unit(s) 910, communications subsystem 930, working memory 935, and/or other components of a computer system as illustrated in FIG. 9.

As noted, alternative embodiments of the method 700 may include additional functionality, which may depend on whether it may method 700 is performed by the mobile device or a computer system in communication with the mobile device, functioning as a location server. For example, for embodiments in which the method 700 is performed by a computer system in communication with the mobile device, determining the RIS-assisted position may comprise receiving, at the computer system, the measurements made by the mobile device. As indicated at block 515 of FIG. 5, for example, in such embodiments, the method 700 may further comprise obtaining an initial position estimate of the mobile device, where initial position estimate is received from the mobile device or determined from a previous position determination of the mobile device. As indicated at block 530 of FIG. 5, the method 700 may further comprise identifying, with the computer system, the one or more RISs, wherein identifying the one or more RISs comprises determining the one or more RISs to be within a threshold distance of the initial position estimate of the mobile device. Additionally or alternatively, as shown at block 535 of FIG. 5, the method 700 may further comprise, for each RIS of the one or more RISs, determining, with computer system, the relative distance between the mobile device and the respective RIS based on the initial position estimate of the mobile device and a location of the respective RIS, and determining, with computer system, whether the mobile device is within the near-field operational distance of the respective RIS, based at least in part on the near-field operational distance of the respective RIS and the determined relative distance between the mobile device and the respective MS. Some embodiments of the method 700 may further comprise receiving, with the computer system, an indication of whether the mobile device is capable of taking near-field RF signal measurements for the RIS-assisted position determination of the mobile device, and sending assistance data from the computer system to the mobile device. The assistance data may comprise information regarding the at least one MS of the one or more RISs, and the at least one MS may be determined based at least in part on the indication of whether the mobile device is capable of taking near-field RF signal measurements. According to some embodiments, for each MS of the at least one MS, the assistance data may comprise an ID of the respective RIS, a location of the respective RIS, an indication of whether the mobile device is within the near-field operational distance of the respective RIS, or any combination thereof. Finally, according to some embodiments, the method 700 may further comprise receiving, with the computer system, an indication of a preference of the mobile device for taking near-field RF signal measurements, wherein the at least one RIS is further determined based at least in part on the preference.

Different functionality may be implemented for embodiments in which the method 700 is performed by the mobile device. For example, according to some embodiments, the mobile device may determine the relative distance between the mobile device and at least one RIS based at least in part on RF signals transmitted by the mobile device and reflected from the at least one RIS. Additionally or alternatively, the method 700 may comprise receiving assistance data from a computer system, wherein the assistance data comprises, for each RIS of the one or more RISs an ID of the respective RIS, a location of the respective RIS, a diameter or largest dimension of the respective RIS, a carrier wavelength, or a Fraunhofer distance of the RIS, or any combination thereof. Some embodiments of the method 700 may further comprise, for each MS of the one or more RISs, determining the near-field operational distance of the RIS, based at least in part on the assistance data. In such embodiments, the mobile may determine the relative distance between the mobile device and at least one MS based at least in part on an initial position estimate the mobile device, and the initial position estimate the mobile device may be determined using a GNSS receiver of the mobile device, an IMU of the mobile device, or a wireless network-based positioning technique that does not use the one or more RISs, or any combination thereof. Finally, according to some embodiments, the method 700 may further comprise sending, from the mobile device to the computer system, an indication of a preference of the mobile device for taking near-field RF signal measurements.

FIG. 8 illustrates an embodiment of a mobile device 800, which can be utilized as a UE 105 or mobile device as described herein above (e.g., in association with FIGS. 1-7). For example, the mobile device 800 can perform one or more of the functions of the method shown in FIG. 7. It should be noted that FIG. 8 is meant only to provide a generalized illustration of various components, any or all of which may be utilized as appropriate. Furthermore, as previously noted, the functionality of the UE discussed in the previously described embodiments may be executed by one or more of the hardware and/or software components illustrated in FIG. 8.

The mobile device 800 is shown comprising hardware elements that can be electrically coupled via a bus 805 (or may otherwise be in communication, as appropriate). The hardware elements may include a processing unit(s) 810 which can include without limitation one or more general-purpose processors, one or more special-purpose processors (such as DSP chips, graphics acceleration processors, application specific integrated circuits (ASICs), and/or the like), and/or other processing structures or means. As shown in FIG. 8, some embodiments may have a separate DSP 820, depending on desired functionality. Location determination and/or other determinations based on wireless communication may be provided in the processing unit(s) 810 and/or wireless communication interface 830 (discussed below). The mobile device 800 also can include one or more input devices 870, which can include without limitation one or more keyboards, touch screens, touch pads, microphones, buttons, dials, switches, and/or the like; and one or more output devices 815, which can include without limitation one or more displays (e.g., touch screens), light emitting diodes (LEDs), speakers, and/or the like.

The mobile device 800 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 800 to communicate with other devices as described in the embodiments above. The wireless communication interface 830 may permit data and signaling to be communicated (e.g., transmitted and received) with base stations/TRPs of a network (e.g., including eNBs, gNBs, ng-eNBs), access points, various base stations and/or other access node types, and/or other network components, computer systems, and/or any other electronic devices (UEs/mobile devices, etc.) communicatively coupled with base stations/TRPs, as described herein. The communication can be carried out via one or more wireless communication antenna(s) 832 that send and/or receive wireless signals 834. According to some embodiments, the wireless communication antenna(s) 832 may comprise a plurality of discrete antennas, antenna arrays, or any combination thereof.

Depending on desired functionality, the wireless communication interface 830 may comprise a separate receiver and transmitter, or any combination of transceivers, transmitters, and/or receivers to communicate with base stations/TRPs (e.g., ng-eNBs and gNBs) and other terrestrial transceivers, such as wireless devices and access points. The mobile device 800 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 800 can further include sensor(s) 840. Sensors 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile device 800 may also include a GNSS receiver 880 capable of receiving signals 884 from one or more GNSS satellites using an antenna 882 (which could be the same as antenna 832). Positioning based on GNSS signal measurement can be utilized to complement and/or incorporate the techniques described herein. The GNSS receiver 880 can extract a position of the mobile device 800, using conventional techniques, from GNSS satellites 110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 880 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 880 is illustrated in FIG. 8 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 810, DSP 820, and/or a processing unit within the wireless communication interface 830 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 810 or DSP 820.

The mobile device 800 may further include and/or be in communication with a memory 860. The memory 860 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the mobile device 800 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the mobile device 800 (and/or processing unit(s) 810 or DSP 820 within mobile device 800). In an aspect, then such code and/or instructions can be used to configure and/or adapt a general-purpose computer (or other device) to perform one or more operations in accordance with the described methods.

FIG. 9 is a block diagram of an embodiment of a computer system 900, which may be used, in whole or in part, to provide the functions of one or more network components as described in the embodiments herein (e.g., location server 160 of FIGS. 1 and 3-6 or LMF of FIG. 2). For example, the computer system 900 can perform one or more of the functions of the method shown in FIG. 7. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. In addition, it can be noted that components illustrated by FIG. 9 can be localized to a single device and/or distributed among various networked devices, which may be disposed at different geographical locations.

The computer system 900 is shown comprising hardware elements that can be electrically coupled via a bus 905 (or may otherwise be in communication, as appropriate). The hardware elements may include processing unit(s) 910, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 900 also may comprise one or more input devices 915, which may comprise without limitation a mouse, a keyboard, a camera, a microphone, and/or the like; and one or more output devices 920, which may comprise without limitation a display device, a printer, and/or the like.

The computer system 900 may further include (and/or be in communication with) one or more non-transitory storage devices 925, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 900 may also include a communications subsystem 930, which may comprise wireless communication technologies managed and controlled by a wireless communication interface 933, as well as wired technologies (such as Ethernet, coaxial communications, universal serial bus (USB), and the like). The wireless communication interface 933 may comprise one or more wireless transceivers that may send and receive wireless signals 955 (e.g., signals according to 5G NR or LTE) via wireless antenna(s) 950. Thus the communications subsystem 930 may comprise a modem, a network card (wireless or wired), an infrared communication device, a wireless communication device, and/or a chipset, and/or the like, which may enable the computer system 900 to communicate on any or all of the communication networks described herein to any device on the respective network, including a UE/mobile device, base stations and/or other TRPs, and/or any other electronic devices described herein. Hence, the communications subsystem 930 may be used to receive and send data as described in the embodiments herein.

In many embodiments, the computer system 900 will further comprise a working memory 935, which may comprise a RAM or ROM device, as described above. Software elements, shown as being located within the working memory 935, may comprise an operating system 940, device drivers, executable libraries, and/or other code, such as one or more applications 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of determining reconfigurable intelligent surface (RIS) operation for RIS-assisted position determination of a mobile device in a wireless communications system, the method comprising: determining, for one or more RISs, whether the mobile device is within a near-field operational distance of the RIS based at least in part on: a determined near-field operational distance of the RIS, and a relative distance between the mobile device and the RIS; conducting a positioning session for the mobile device, wherein: the positioning session includes measurements made by the mobile device of radio frequency (RF) signals reflected from at least one RIS of the one or more RISs, and the measurements made by the mobile device are based, at least in part, on whether the mobile device is within the respective near-field operational distance of the at least one RIS of the one or more RISs; determining an RIS-assisted position of the mobile device based on the measurements made by the mobile device; and providing the determined RIS-assisted position of the mobile device.

Clause 2. The method of clause 1, wherein the method is performed by a computer system in communication with the mobile device, and wherein conducting the positioning session comprises receiving, at the computer system, the measurements made by the mobile device.

Clause 3. The method of clause 2, further comprising obtaining an initial position estimate of the mobile device, wherein initial position estimate is received from the mobile device or determined from a previous position determination of the mobile device.

Clause 4. The method of clause 3, further comprising identifying, with the computer system, the one or more RISs, wherein identifying the one or more RISs comprises determining the one or more RISs to be within a threshold distance of the initial position estimate of the mobile device.

Clause 5. The method of clause 3 or 4, further comprising, for each RIS of the one or more RISs: determining, with computer system, the relative distance between the mobile device and the respective RIS based on the initial position estimate of the mobile device and a location of the respective RIS, and determining, with computer system, whether the mobile device is within the near-field operational distance of the respective RIS, based at least in part on the near-field operational distance of the respective RIS and the determined relative distance between the mobile device and the respective RIS.

Clause 6. The method of any of clauses 3-5, further comprising: receiving, with the computer system, an indication of whether the mobile device is capable of taking near-field RF signal measurements for the RIS-assisted position determination of the mobile device; and sending assistance data from the computer system to the mobile device, wherein: the assistance data comprises information regarding the at least one RIS of the one or more RISs, and the at least one RIS is determined based at least in part on the indication of whether the mobile device is capable of taking near-field RF signal measurements.

Clause 7. The method of clause 6, wherein, for each RIS of the at least one RIS, the assistance data comprises: an identifier (ID) of the respective RIS, a location of the respective RIS, an indication of whether the mobile device is within the near-field operational distance of the respective RIS, or any combination thereof.

Clause 8. The method of any of clause 7, further comprising receiving, with the computer system, an indication of a preference of the mobile device for taking near-field RF signal measurements, wherein the at least one RIS is further determined based at least in part on the preference.

Clause 9. The method of any of clause 7 or 8, further comprising receiving a request for a location of the mobile device from a requesting entity, and wherein providing the determined RIS-assisted position of the mobile device comprises providing the determined RIS-assisted position of the mobile device to the requesting entity.

Clause 10. The method of clause 1, wherein the method is performed by the mobile device.

Clause 11. The method of clause 10, wherein the mobile device determines the relative distance between the mobile device and the at least one RIS based at least in part on radio frequency (RF) signals transmitted by the mobile device and reflected from the at least one RIS.

Clause 12. The method of clause 10 or 11, further comprising receiving assistance data from a computer system, wherein the assistance data comprises, for each RIS of the one or more RISs: an identifier (ID) of the respective RIS, a location of the respective RIS, a diameter or largest dimension of the respective RIS, a carrier wavelength, or a Fraunhofer distance of the RIS, or any combination thereof.

Clause 13. The method of any of clauses 10-12, further comprising, for each RIS of the one or more RISs, determining the near-field operational distance of the RIS, based at least in part on the assistance data.

Clause 14. The method of any of clauses 10-13, wherein the mobile device determines the relative distance between the mobile device and the at least one RIS based at least in part on an initial position estimate the mobile device, wherein the initial position estimate the mobile device is determined using: a Global Navigation Satellite System (GNSS) receiver of the mobile device, an inertial measurement unit (IMU) of the mobile device, or a wireless network-based positioning technique that does not use the one or more RISs, or any combination thereof.

Clause 15. The method of clause 14, further comprising sending, from the mobile device to a computer system, an indication of a preference of the mobile device for taking near-field RF signal measurements.

Clause 16. The method of clause 10, wherein providing the determined RIS-assisted position of the mobile device comprises providing the determined RIS-assisted position of the mobile device to a user of the mobile device or an application executed by the mobile device.

Clause 17. A device for determining reconfigurable intelligent surface (RIS) operation for RIS-assisted position determination of a mobile device in a wireless communications system, the device comprising: a transceiver; a memory; and one or more processing units communicatively coupled with the transceiver and the memory, the one or more processing units configured to: determine, for one or more RISs, whether the mobile device is within a near-field operational distance of the RIS based at least in part on: a determined near-field operational distance of the RIS, and a relative distance between the mobile device and the RIS; conduct a positioning session for the mobile device, wherein: the positioning session includes measurements made by the mobile device of radio frequency (RF) signals reflected from at least one RIS of the one or more RISs, and the measurements made by the mobile device are based, at least in part, on whether the mobile device is within the respective near-field operational distance of the at least one RIS of the one or more RISs; determine an RIS-assisted position of the mobile device based on the measurements made by the mobile device; and provide the determined RIS-assisted position of the mobile device.

Clause 18. The device of clause 17, wherein the device comprises a computer system in communication with the mobile device, and wherein, to conduct the positioning session, the one or more processing units configured to receive, via the transceiver, the measurements made by the mobile device.

Clause 19. The device of clause 18, wherein the one or more processing units are further configured to obtain an initial position estimate of the mobile device, and either receive the initial position estimate from the mobile device or determine the initial position estimate from a previous position determination of the mobile device.

Clause 20. The device of clause 19, wherein the one or more processing units are further configured to identify the one or more RISs, wherein, to identify the one or more RISs, the one or more processing units configured to determine the one or more RISs to be within a threshold distance of the initial position estimate of the mobile device.

Clause 21. The device of clause 19 or 20, wherein the one or more processing units are further configured to, for each RIS of the one or more RISs: determine the relative distance between the mobile device and the respective RIS based on the initial position estimate of the mobile device and a location of the respective RIS, and determine whether the mobile device is within the near-field operational distance of the respective RIS, based at least in part on the near-field operational distance of the respective RIS and the determined relative distance between the mobile device and the respective RIS.

Clause 22. The device of any of clauses 19-21, wherein the one or more processing units are further configured to: receive, via the transceiver, an indication of whether the mobile device is capable of taking near-field RF signal measurements for the RIS-assisted position determination of the mobile device; and send, via the transceiver, assistance data from the computer system to the mobile device, wherein: the assistance data comprises information regarding the at least one RIS of the one or more RISs, and the at least one RIS is determined based at least in part on the indication of whether the mobile device is capable of taking near-field RF signal measurements.

Clause 23. The device of clause 22, wherein, for each RIS of the at least one RIS, the assistance data comprises: an identifier (ID) of the respective RIS, a location of the respective RIS, an indication of whether the mobile device is within the near-field operational distance of the respective RIS, or any combination thereof.

Clause 24. The device of clause 23, wherein the one or more processing units are further configured to receive, via the transceiver, an indication of a preference of the mobile device for taking near-field RF signal measurements, wherein the at least one RIS is further determined based at least in part on the preference.

Clause 25. The device of any of clause 23 or 24, wherein the one or more processing units are further configured to receive a request for a location of the mobile device from a requesting entity, and wherein, to provide the determined RIS-assisted position of the mobile device, the one or more processing units are configured to provide the determined RIS-assisted position of the mobile device to the requesting entity.

Clause 26. The device of clause 17, wherein the device comprises the mobile device.

Clause 27. The device of clause 26, wherein the one or more processing units are further configured to determine the relative distance between the mobile device and the at least one RIS based at least in part on radio frequency (RF) signals transmitted by the mobile device and reflected from the at least one RIS.

Clause 28. The device of clause 26 or 27, wherein the one or more processing units are further configured to receive, via the transceiver, assistance data from a computer system, wherein the assistance data comprises, for each RIS of the one or more RISs: an identifier (ID) of the respective RIS, a location of the respective RIS, a diameter or largest dimension of the respective RIS, a carrier wavelength, or a Fraunhofer distance of the RIS, or any combination thereof.

Clause 29. The device of any of clauses 26-28, wherein the one or more processing units are further configured to, for each RIS of the one or more RISs, determine the near-field operational distance of the RIS, based at least in part on the assistance data.

Clause 30. The device of any of clauses 26-29, wherein the one or more processing units are further configured to determine the relative distance between the mobile device and the at least one RIS based at least in part on an initial position estimate the mobile device, and wherein the one or more processing units are further configured to determine the initial position estimate the mobile device using: a Global Navigation Satellite System (GNSS) receiver of the mobile device, an inertial measurement unit (IMU) of the mobile device, or a wireless network-based positioning technique that does not use the one or more RISs, or any combination thereof.

Clause 31. The device of clause 30, wherein the one or more processing units are further configured to send, via the transceiver to a computer system, an indication of a preference of the mobile device for taking near-field RF signal measurements.

Clause 32. The device of clause 26, wherein, to provide the determined RIS-assisted position of the mobile device, the one or more processing units are configured to the provide the determined RIS-assisted position of the mobile device to a user of the mobile device or an application executed by the mobile device.

Clause 33. A device for determining reconfigurable intelligent surface (RIS) operation for RIS-assisted position determination of a mobile device in a wireless communications system, the device comprising: means for determining, for one or more RISs, whether the mobile device is within a near-field operational distance of the RIS based at least in part on: a determined near-field operational distance of the RIS, and a relative distance between the mobile device and the RIS; means for conducting a positioning session for the mobile device, wherein: the positioning session includes measurements made by the mobile device of radio frequency (RF) signals reflected from at least one RIS of the one or more RISs, and the measurements made by the mobile device are based, at least in part, on whether the mobile device is within the respective near-field operational distance of the at least one RIS of the one or more RISs; means for determining an RIS-assisted position of the mobile device based on the measurements made by the mobile device; and means for providing the determined RIS-assisted position of the mobile device.

Clause 34. The device of clause 33, wherein the device comprises a computer system in communication with the mobile device, and wherein the means for conducting the positioning session comprises means for receiving, at the computer system, the measurements made by the mobile device.

Clause 35. The device of clause 34, further comprising means for obtaining an initial position estimate of the mobile device, wherein initial position estimate is received from the mobile device or determined from a previous position determination of the mobile device.

Clause 36. The device of clause 35, further comprising means for identifying, with the computer system, the one or more RISs, wherein the means for identifying the one or more RISs comprises means for determining the one or more RISs to be within a threshold distance of the initial position estimate of the mobile device.

Clause 37. The device of clause 35 or 36, further comprising, for each RIS of the one or more RISs: means for determining the relative distance between the mobile device and the respective RIS based on the initial position estimate of the mobile device and a location of the respective RIS, and means for determining whether the mobile device is within the near-field operational distance of the respective RIS, based at least in part on the near-field operational distance of the respective RIS and the determined relative distance between the mobile device and the respective RIS.

Clause 38. The device of any of clauses 35-37, wherein the device comprises the mobile device.

Clause 39. The device of clause 38, further comprising means for receiving assistance data from a computer system, wherein the assistance data comprises, for each RIS of the one or more RISs: an identifier (ID) of the respective RIS, a location of the respective RIS, a diameter or largest dimension of the respective RIS, a carrier wavelength, or a Fraunhofer distance of the RIS, or any combination thereof.

Clause 40. The device of clause 39, further comprising means for determining the relative distance between the mobile device and the at least one RIS based at least in part on an initial position estimate the mobile device, wherein the initial position estimate the mobile device is determined using: a Global Navigation Satellite System (GNSS) receiver of the mobile device, an inertial measurement unit (IMU) of the mobile device, or a wireless network-based positioning technique that does not use the one or more RISs, or any combination thereof.

Clause 41. A non-transitory computer-readable medium storing instructions for determining reconfigurable intelligent surface (RIS) operation for RIS-assisted position determination of a mobile device in a wireless communications system, the instructions comprising code for: determining, for one or more RISs, whether the mobile device is within a near-field operational distance of the RIS based at least in part on: a determined near-field operational distance of the RIS, and a relative distance between the mobile device and the RIS; conducting a positioning session for the mobile device, wherein: the positioning session includes measurements made by the mobile device of radio frequency (RF) signals reflected from at least one RIS of the one or more RISs, and the measurements made by the mobile device are based, at least in part, on whether the mobile device is within the respective near-field operational distance of the at least one RIS of the one or more RISs; determining an RIS-assisted position of the mobile device based on the measurements made by the mobile device; and providing the determined RIS-assisted position of the mobile device.

What is claimed is:

1. A method of determining reconfigurable intelligent surface (RIS) operation for RIS-assisted position determination of a mobile device in a wireless communications system, the method comprising:

determining, for one or more RISs, whether the mobile device is within a near-field operational distance of the RIS based at least in part on:

a determined near-field operational distance of the RIS, and a relative distance between an initial position estimate of the mobile device and a location of the RIS, wherein the initial position estimate is determined by the mobile device;

conducting a positioning session for the mobile device, wherein:

the positioning session includes measurements made by the mobile device of radio frequency (RF) signals reflected from at least one RIS of the one or more RISs, and the measurements made by the mobile device are based, at least in part, on whether the mobile device is within the respective near-field operational distance of the at least one RIS of the one or more RISs;

determining an RIS-assisted position of the mobile device based on the measurements made by the mobile device; and providing the determined RIS-assisted position of the mobile device.

2. The method of claim 1, wherein the method is performed by a computer system in communication with the mobile device, and wherein conducting the positioning session comprises receiving, at the computer system, the measurements made by the mobile device.

3. The method of claim 2, further comprising obtaining an initial position estimate of the mobile device, wherein initial position estimate is received from the mobile device or determined from a previous position determination of the mobile device.

4. The method of claim 3, further comprising identifying, with the computer system, the one or more RISs, wherein identifying the one or more RISs comprises determining the one or more RISs to be within a threshold distance of the initial position estimate of the mobile device.

5. The method of claim 3, further comprising, for each RIS of the one or more RISs:

determining, with computer system, the relative distance between the mobile device and the respective RIS based on the initial position estimate of the mobile device and a location of the respective RIS, and determining, with computer system, whether the mobile device is within the near-field operational distance of the respective RIS, based at least in part on the near-field operational distance of the respective RIS and the determined relative distance between the mobile device and the respective RIS.

6. The method of claim 5, further comprising:

receiving, with the computer system, an indication of whether the mobile device is capable of taking near-field RF signal measurements for the RIS-assisted position determination of the mobile device; and sending assistance data from the computer system to the mobile device, wherein:

the assistance data comprises information regarding the at least one RIS of the one or more RISs, and the at least one RIS is determined based at least in part on the indication of whether the mobile device is capable of taking near-field RF signal measurements.

7. The method of claim 6, wherein, for each RIS of the at least one RIS, the assistance data comprises:

an identifier (ID) of the respective RIS, a location of the respective RIS, an indication of whether the mobile device is within the near-field operational distance of the respective RIS, or any combination thereof.

8. The method of claim 6, further comprising receiving, with the computer system, an indication of a preference of the mobile device for taking near-field RF signal measurements, wherein the at least one RIS is further determined based at least in part on the preference.

9. The method of claim 8, further comprising sending, from the mobile device to a computer system, an indication of a preference of the mobile device for taking near-field RF signal measurements.

10. The method of claim 1, wherein the method is performed by the mobile device, and wherein the mobile device determines the relative distance between the mobile device and the at least one RIS based at least in part on radio frequency (RF) signals transmitted by the mobile device and reflected from the at least one RIS.

11. The method of claim 10, further comprising receiving assistance data from a computer system, wherein the assistance data comprises, for each RIS of the one or more RISs:

an identifier (ID) of the respective RIS, a location of the respective RIS, a diameter or largest dimension of the respective RIS, a carrier wavelength, or a Fraunhofer distance of the RIS, or any combination thereof.

12. The method of claim 11, further comprising, for each RIS of the one or more RISs, determining the near-field operational distance of the RIS, based at least in part on the assistance data.

13. A device for determining reconfigurable intelligent surface (RIS) operation for RIS-assisted position determination of a mobile device in a wireless communications system, the device comprising:

a transceiver;

a memory; and one or more processing units communicatively coupled with the transceiver and the memory, the one or more processing units configured to:

determine, for one or more RISs, whether the mobile device is within a near-field operational distance of the RIS based at least in part on:

a determined near-field operational distance of the RIS, and a relative distance between an initial position estimate of the mobile device and a location of the RIS, wherein the initial position estimate is determined by the mobile device;

conduct a positioning session for the mobile device, wherein:

the positioning session includes measurements made by the mobile device of radio frequency (RF) signals reflected from at least one RIS of the one or more RISs, and the measurements made by the mobile device are based, at least in part, on whether the mobile device is within the respective near-field operational distance of the at least one RIS of the one or more RISs;

determine an RIS-assisted position of the mobile device based on the measurements made by the mobile device; and provide the determined RIS-assisted position of the mobile device.

14. The device of claim 13, wherein the device comprises a computer system in communication with the mobile device, and wherein, to conduct the positioning session, the one or more processing units configured to receive, via the transceiver, the measurements made by the mobile device.

15. The device of claim 14, wherein the one or more processing units are further configured to obtain an initial position estimate of the mobile device, and either receive the initial position estimate from the mobile device or determine the initial position estimate from a previous position determination of the mobile device.

16. The device of claim 15, wherein the one or more processing units are further configured to identify the one or more RISs, wherein, to identify the one or more RISs, the one or more processing units configured to determine the one or more RISs to be within a threshold distance of the initial position estimate of the mobile device.

17. The device of claim 15, wherein the one or more processing units are further configured to, for each RIS of the one or more RISs:

determine the relative distance between the mobile device and the respective RIS based on the initial position estimate of the mobile device and a location of the respective RIS, and determine whether the mobile device is within the near-field operational distance of the respective RIS, based at least in part on the near-field operational distance of the respective RIS and the determined relative distance between the mobile device and the respective RIS.

18. The device of claim 17, wherein the one or more processing units are further configured to:

receive, via the transceiver, an indication of whether the mobile device is capable of taking near-field RF signal measurements for the RIS-assisted position determination of the mobile device; and send, via the transceiver, assistance data from the computer system to the mobile device, wherein:

the assistance data comprises information regarding the at least one RIS of the one or more RISs, and the at least one RIS is determined based at least in part on the indication of whether the mobile device is capable of taking near-field RF signal measurements.

19. The device of claim 18, wherein, for each RIS of the at least one RIS, the assistance data comprises:

an identifier (ID) of the respective RIS, a location of the respective RIS, an indication of whether the mobile device is within the near-field operational distance of the respective RIS, or any combination thereof.

20. The device of claim 18, wherein the one or more processing units are further configured to receive, via the transceiver, an indication of a preference of the mobile device for taking near-field RF signal measurements, wherein the at least one RIS is further determined based at least in part on the preference.

21. The device of claim 20, wherein the one or more processing units are further configured to send, via the transceiver to a computer system, an indication of a preference of the mobile device for taking near-field RF signal measurements.

22. The device of claim 13, wherein the device comprises the mobile device, and wherein the one or more processing units are further configured to determine the relative distance between the mobile device and the at least one RIS based at least in part on radio frequency (RF) signals transmitted by the mobile device and reflected from the at least one RIS.

23. The device of claim 22, wherein the one or more processing units are further configured to receive, via the transceiver, assistance data from a computer system, wherein the assistance data comprises, for each RIS of the one or more RISs:

an identifier (ID) of the respective RIS, a location of the respective RIS, a diameter or largest dimension of the respective RIS, a carrier wavelength, or a Fraunhofer distance of the RIS, or any combination thereof.

24. The device of claim 23, wherein the one or more processing units are further configured to, for each RIS of the one or more RISs, determine the near-field operational distance of the RIS, based at least in part on the assistance data.

25. A device for determining reconfigurable intelligent surface (RIS) operation for RIS-assisted position determination of a mobile device in a wireless communications system, the device comprising:

means for determining, for one or more RISs, whether the mobile device is within a near-field operational distance of the RIS based at least in part on:

a determined near-field operational distance of the RIS, and a relative distance between an initial position estimate of the mobile device and a location of the RIS, wherein the initial position estimate is determined by the mobile device;

means for conducting a positioning session for the mobile device, wherein:

the positioning session includes measurements made by the mobile device of radio frequency (RF) signals reflected from at least one RIS of the one or more RISs, and the measurements made by the mobile device are based, at least in part, on whether the mobile device is within the respective near-field operational distance of the at least one RIS of the one or more RISs;

means for determining an RIS-assisted position of the mobile device based on the measurements made by the mobile device; and means for providing the determined RIS-assisted position of the mobile device.

26. The device of claim 25, wherein the device comprises a computer system in communication with the mobile device, and wherein the means for conducting the positioning session comprises means for receiving, at the computer system, the measurements made by the mobile device.

27. The device of claim 26, further comprising means for obtaining an initial position estimate of the mobile device, wherein initial position estimate is received from the mobile device or determined from a previous position determination of the mobile device.

28. The device of claim 27, further comprising means for identifying, with the computer system, the one or more RISs, wherein the means for identifying the one or more RISs comprises means for determining the one or more RISs to be within a threshold distance of the initial position estimate of the mobile device.

29. The device of claim 27, further comprising, for each RIS of the one or more RISs:

means for determining the relative distance between the mobile device and the respective RIS based on the initial position estimate of the mobile device and a location of the respective RIS, and means for determining whether the mobile device is within the near-field operational distance of the respective RIS, based at least in part on the near-field operational distance of the respective RIS and the determined relative distance between the mobile device and the respective RIS.

30. A non-transitory computer-readable medium storing instructions for determining reconfigurable intelligent surface (RIS) operation for RIS-assisted position determination of a mobile device in a wireless communications system, the instructions comprising code for:

determining, for one or more RISs, whether the mobile
device is within a near-field operational distance of the
RIS based at least in part on:

a determined near-field operational distance of the RIS,
and a relative distance between an initial position estimate of
the mobile device and a location of the RIS, wherein
the initial position estimate is determined by the mobile
device;

conducting a positioning session for the mobile device,
wherein:

the positioning session includes measurements made by
the mobile device of radio frequency (RF) signals
reflected from at least one RIS of the one or more RISs,
and the measurements made by the mobile device are based,
at least in part, on whether the mobile device is within
the respective near-field operational distance of the at
least one RIS of the one or more RISs;

determining an RIS-assisted position of the mobile device
based on the measurements made by the mobile device;
and providing the determined RIS-assisted position of the
mobile device.

* * * * *